United States Patent
Mukesh et al.

(10) Patent No.: US 12,327,133 B1
(45) Date of Patent: Jun. 10, 2025

(54) APPLICATION GATEWAYS IN AN ON-DEMAND NETWORK CODE EXECUTION SYSTEM

(71) Applicant: Amazon Technologies, Inc., Seattle, WA (US)

(72) Inventors: Lodaya Varun Mukesh, Mill Creek, WA (US); Sridhar Srinivasan, Bothell, WA (US); Hamza Arain, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/362,515

(22) Filed: Mar. 22, 2019

(51) Int. Cl.
*G06F 9/48* (2006.01)
*G06F 8/41* (2018.01)
*G06F 9/50* (2006.01)

(52) U.S. Cl.
CPC ............ *G06F 9/485* (2013.01); *G06F 8/41* (2013.01); *G06F 9/4881* (2013.01); *G06F 9/505* (2013.01); *G06F 9/5083* (2013.01); *G06F 9/5005* (2013.01); *G06F 9/5072* (2013.01)

(58) Field of Classification Search
None
See application file for complete search history.

(56) References Cited

U.S. PATENT DOCUMENTS

| | | |
|---|---|---|
| 4,949,254 A | 8/1990 | Shorter |
| 5,283,888 A | 2/1994 | Dao et al. |
| 5,835,764 A | 11/1998 | Platt et al. |

(Continued)

FOREIGN PATENT DOCUMENTS

| | | |
|---|---|---|
| CA | 2962633 C | 4/2012 |
| CA | 2975522 A1 | 8/2016 |

(Continued)

OTHER PUBLICATIONS

IBM, what is Serverless computing, https://www.ibm.com/topics/serverless#:~:text=Serverless%20is%20a%20cloud%20computing,managing%20servers%20or%20backend%20infrastructure, pp. 1-11 (Year: 2023).*

(Continued)

*Primary Examiner* — Abu Zar Ghaffari
(74) *Attorney, Agent, or Firm* — KNOBBE, MARTENS, OLSON & BEAR, LLP

(57) ABSTRACT

Systems and methods are described for providing an application-level gateway that allows computing devices to utilize an on-demand network code execution system. An on-demand network code execution system may allow users to submit code to be executed in a serverless environment, and may provide an interface for executing the user-submitted code on demand. The interface may require that users authenticate, provide input in a particular format, or meet other criteria when sending a request to execute the code. An application-level gateway may thus provide an interface that implements these functions, thereby allowing computing devices to interact with the code as though it were running on a server (e.g., by using the Hypertext Transport Protocol). The application-level gateway may also use on-demand code execution to provide load balancing for servers that are running the user-submitted code, and seamlessly provide access to code that runs on both server-based and serverless environments.

21 Claims, 6 Drawing Sheets

(56) References Cited

U.S. PATENT DOCUMENTS

| | | |
|---|---|---|
| 5,970,488 A | 10/1999 | Crowe et al. |
| 5,983,197 A | 11/1999 | Enta |
| 6,237,005 B1 | 5/2001 | Griffin |
| 6,260,058 B1 | 7/2001 | Hoenninger et al. |
| 6,385,636 B1 | 5/2002 | Suzuki |
| 6,463,509 B1 | 10/2002 | Teoman et al. |
| 6,501,736 B1 | 12/2002 | Smolik et al. |
| 6,523,035 B1 | 2/2003 | Fleming et al. |
| 6,549,936 B1 | 4/2003 | Hirabayashi |
| 6,708,276 B1 | 3/2004 | Yarsa et al. |
| 7,036,121 B1 | 4/2006 | Casabona et al. |
| 7,308,463 B2 | 12/2007 | Taulbee et al. |
| 7,340,522 B1 | 3/2008 | Basu et al. |
| 7,360,215 B2 | 4/2008 | Kraiss et al. |
| 7,558,719 B1 | 7/2009 | Donlin |
| 7,577,722 B1 | 8/2009 | Khandekar et al. |
| 7,590,806 B2 | 9/2009 | Harris et al. |
| 7,640,574 B1 | 12/2009 | Kim et al. |
| 7,665,090 B1 | 2/2010 | Tormasov et al. |
| 7,707,579 B2 | 4/2010 | Rodriguez |
| 7,730,464 B2 | 6/2010 | Trowbridge |
| 7,774,191 B2 | 8/2010 | Berkowitz et al. |
| 7,823,186 B2 | 10/2010 | Pouliot |
| 7,831,464 B1 | 11/2010 | Nichols et al. |
| 7,870,153 B2 | 1/2011 | Croft et al. |
| 7,886,021 B2 | 2/2011 | Scheifler et al. |
| 7,949,677 B2 | 5/2011 | Croft et al. |
| 7,954,150 B2 | 5/2011 | Croft et al. |
| 8,010,679 B2 | 8/2011 | Low et al. |
| 8,010,990 B2 | 8/2011 | Ferguson et al. |
| 8,024,564 B2 | 9/2011 | Bassani et al. |
| 8,046,765 B2 | 10/2011 | Cherkasova et al. |
| 8,051,180 B2 | 11/2011 | Mazzaferri et al. |
| 8,051,266 B2 | 11/2011 | DeVal et al. |
| 8,065,676 B1 | 11/2011 | Sahai et al. |
| 8,065,682 B2 | 11/2011 | Baryshnikov et al. |
| 8,095,931 B1 | 1/2012 | Chen et al. |
| 8,127,284 B2 | 2/2012 | Meijer et al. |
| 8,146,073 B2 | 3/2012 | Sinha |
| 8,166,304 B2 | 4/2012 | Murase et al. |
| 8,171,473 B2 | 5/2012 | Lavin |
| 8,201,026 B1 | 6/2012 | Bornstein et al. |
| 8,209,695 B1 | 6/2012 | Pruyne et al. |
| 8,219,987 B1 * | 7/2012 | Vlaovic .................. G06F 9/455 |
| | | 718/1 |
| 8,296,267 B2 | 10/2012 | Cahill et al. |
| 8,321,554 B2 | 11/2012 | Dickinson |
| 8,321,558 B1 | 11/2012 | Sirota et al. |
| 8,336,079 B2 | 12/2012 | Budko et al. |
| 8,352,608 B1 | 1/2013 | Keagy et al. |
| 8,387,075 B1 | 2/2013 | McCann et al. |
| 8,392,558 B1 | 3/2013 | Ahuja et al. |
| 8,402,514 B1 | 3/2013 | Thompson et al. |
| 8,417,723 B1 | 4/2013 | Lissack et al. |
| 8,429,282 B1 | 4/2013 | Ahuja |
| 8,448,165 B1 | 5/2013 | Conover |
| 8,479,195 B2 | 7/2013 | Adams et al. |
| 8,490,088 B2 | 7/2013 | Tang |
| 8,555,281 B1 | 10/2013 | Van Dijk et al. |
| 8,560,699 B1 | 10/2013 | Theimer et al. |
| 8,566,835 B2 | 10/2013 | Wang et al. |
| 8,601,323 B2 | 12/2013 | Tsantilis |
| 8,613,070 B1 | 12/2013 | Borzycki et al. |
| 8,615,589 B1 | 12/2013 | Adogla et al. |
| 8,631,130 B2 | 1/2014 | Jackson |
| 8,667,471 B2 | 3/2014 | Wintergerst et al. |
| 8,677,359 B1 | 3/2014 | Cavage et al. |
| 8,694,996 B2 | 4/2014 | Cawlfield et al. |
| 8,700,768 B2 | 4/2014 | Benari |
| 8,713,093 B1 | 4/2014 | Upadhyay et al. |
| 8,719,415 B1 | 5/2014 | Sirota et al. |
| 8,725,702 B1 | 5/2014 | Raman et al. |
| 8,756,322 B1 | 6/2014 | Lynch |
| 8,756,696 B1 | 6/2014 | Miller |
| 8,763,091 B1 | 6/2014 | Singh et al. |
| 8,769,519 B2 | 7/2014 | Leitman et al. |
| 8,793,676 B2 | 7/2014 | Quinn et al. |
| 8,799,236 B1 | 8/2014 | Azari et al. |
| 8,799,879 B2 | 8/2014 | Wright et al. |
| 8,806,266 B1 | 8/2014 | Qu et al. |
| 8,806,468 B2 | 8/2014 | Meijer et al. |
| 8,806,644 B1 | 8/2014 | McCorkendale et al. |
| 8,819,679 B2 | 8/2014 | Agarwal et al. |
| 8,825,863 B2 | 9/2014 | Hansson et al. |
| 8,825,964 B1 | 9/2014 | Sopka et al. |
| 8,839,035 B1 | 9/2014 | Dimitrovich et al. |
| 8,850,432 B2 | 9/2014 | Mcgrath et al. |
| 8,869,300 B2 | 10/2014 | Singh et al. |
| 8,874,952 B2 | 10/2014 | Tameshige et al. |
| 8,904,008 B2 | 12/2014 | Calder et al. |
| 8,949,457 B1 | 2/2015 | Theroux et al. |
| 8,966,495 B2 | 2/2015 | Kulkarni |
| 8,972,980 B2 | 3/2015 | Banga et al. |
| 8,990,807 B2 | 3/2015 | Wu et al. |
| 8,997,093 B2 | 3/2015 | Dimitrov |
| 9,002,871 B2 | 4/2015 | Bulkowski et al. |
| 9,021,501 B2 | 4/2015 | Li et al. |
| 9,026,658 B2 * | 5/2015 | Xu .................. G06F 9/5027 |
| | | 709/224 |
| 9,027,087 B2 | 5/2015 | Ishaya et al. |
| 9,038,068 B2 | 5/2015 | Engle et al. |
| 9,052,935 B1 | 6/2015 | Rajaa |
| 9,086,897 B2 | 7/2015 | Oh et al. |
| 9,086,924 B2 | 7/2015 | Barsness et al. |
| 9,092,837 B2 | 7/2015 | Bala et al. |
| 9,098,528 B2 | 8/2015 | Wang |
| 9,104,477 B2 | 8/2015 | Kodialam et al. |
| 9,110,732 B1 | 8/2015 | Forschmiedt et al. |
| 9,110,770 B1 | 8/2015 | Raju et al. |
| 9,111,037 B1 | 8/2015 | Nalis et al. |
| 9,112,813 B2 | 8/2015 | Jackson |
| 9,116,733 B2 | 8/2015 | Banga et al. |
| 9,130,900 B2 | 9/2015 | Tran |
| 9,141,410 B2 | 9/2015 | Leafe et al. |
| 9,146,764 B1 | 9/2015 | Wagner |
| 9,152,406 B2 | 10/2015 | De et al. |
| 9,154,955 B1 | 10/2015 | Bertz et al. |
| 9,164,754 B1 | 10/2015 | Pohlack |
| 9,176,871 B1 | 11/2015 | Serlet |
| 9,183,019 B2 | 11/2015 | Kruglick |
| 9,189,778 B1 | 11/2015 | Sh. Al-Rashidi |
| 9,195,520 B2 | 11/2015 | Turk |
| 9,208,007 B2 | 12/2015 | Harper et al. |
| 9,218,190 B2 | 12/2015 | Anand et al. |
| 9,223,561 B2 | 12/2015 | Orveillon et al. |
| 9,223,966 B1 | 12/2015 | Satish et al. |
| 9,250,893 B2 | 2/2016 | Blahaerath et al. |
| 9,268,586 B2 | 2/2016 | Voccio et al. |
| 9,298,633 B1 | 3/2016 | Zhao et al. |
| 9,317,689 B2 | 4/2016 | Aissi |
| 9,323,556 B2 | 4/2016 | Wagner |
| 9,361,145 B1 | 6/2016 | Wilson et al. |
| 9,405,582 B2 | 8/2016 | Fuller et al. |
| 9,411,645 B1 | 8/2016 | Duan et al. |
| 9,413,626 B2 | 8/2016 | Reque et al. |
| 9,417,918 B2 | 8/2016 | Chin et al. |
| 9,430,290 B1 | 8/2016 | Gupta et al. |
| 9,436,555 B2 | 9/2016 | Dornemann et al. |
| 9,461,996 B2 | 10/2016 | Hayton et al. |
| 9,471,775 B1 | 10/2016 | Wagner et al. |
| 9,471,776 B2 | 10/2016 | Gu et al. |
| 9,483,335 B1 | 11/2016 | Wagner et al. |
| 9,489,227 B2 | 11/2016 | Oh et al. |
| 9,497,136 B1 | 11/2016 | Ramarao et al. |
| 9,501,345 B1 | 11/2016 | Lietz et al. |
| 9,514,037 B1 | 12/2016 | Dow et al. |
| 9,537,788 B2 | 1/2017 | Reque et al. |
| 9,563,613 B1 | 2/2017 | Dinkel et al. |
| 9,565,190 B1 | 2/2017 | Telvik et al. |
| 9,575,798 B2 | 2/2017 | Terayama et al. |
| 9,588,790 B1 | 3/2017 | Wagner et al. |
| 9,594,590 B2 | 3/2017 | Hsu |
| 9,596,350 B1 | 3/2017 | Dymshyts et al. |
| 9,600,312 B2 | 3/2017 | Wagner et al. |

(56) References Cited

U.S. PATENT DOCUMENTS

| | | | |
|---|---|---|---|
| 9,613,127 | B1 | 4/2017 | Rus et al. |
| 9,626,204 | B1 | 4/2017 | Banga et al. |
| 9,628,332 | B2 | 4/2017 | Bruno, Jr. et al. |
| 9,635,132 | B1 | 4/2017 | Lin et al. |
| 9,652,306 | B1 | 5/2017 | Wagner et al. |
| 9,652,617 | B1 | 5/2017 | Evans et al. |
| 9,654,508 | B2 | 5/2017 | Barton et al. |
| 9,661,011 | B1 | 5/2017 | Van Horenbeeck et al. |
| 9,678,773 | B1 | 6/2017 | Wagner et al. |
| 9,678,778 | B1 | 6/2017 | Youseff |
| 9,703,681 | B2 | 7/2017 | Taylor et al. |
| 9,715,402 | B2 | 7/2017 | Wagner et al. |
| 9,720,661 | B2 | 8/2017 | Gschwind et al. |
| 9,720,662 | B2 | 8/2017 | Gschwind et al. |
| 9,727,725 | B2 | 8/2017 | Wagner et al. |
| 9,733,967 | B2 | 8/2017 | Wagner et al. |
| 9,760,387 | B2 | 9/2017 | Wagner et al. |
| 9,760,443 | B2 | 9/2017 | Tarasuk-Levin et al. |
| 9,767,271 | B2 | 9/2017 | Ghose |
| 9,785,476 | B2 | 10/2017 | Wagner et al. |
| 9,787,779 | B2 | 10/2017 | Frank et al. |
| 9,798,831 | B2 | 10/2017 | Chattopadhyay et al. |
| 9,799,017 | B1 | 10/2017 | Vermeulen et al. |
| 9,811,363 | B1 | 11/2017 | Wagner |
| 9,811,434 | B1 | 11/2017 | Wagner |
| 9,817,695 | B2 | 11/2017 | Clark |
| 9,830,175 | B1 | 11/2017 | Wagner |
| 9,830,193 | B1 | 11/2017 | Wagner et al. |
| 9,830,449 | B1 | 11/2017 | Wagner |
| 9,864,636 | B1 | 1/2018 | Patel et al. |
| 9,898,393 | B2 | 2/2018 | Moorthi et al. |
| 9,910,713 | B2 | 3/2018 | Wisniewski et al. |
| 9,921,864 | B2 | 3/2018 | Singaravelu et al. |
| 9,928,108 | B1 | 3/2018 | Wagner et al. |
| 9,929,916 | B1 | 3/2018 | Subramanian et al. |
| 9,930,103 | B2 | 3/2018 | Thompson |
| 9,930,133 | B2 | 3/2018 | Susarla et al. |
| 9,952,896 | B2 | 4/2018 | Wagner et al. |
| 9,977,691 | B2 | 5/2018 | Marriner et al. |
| 9,979,817 | B2 | 5/2018 | Huang et al. |
| 9,983,982 | B1 | 5/2018 | Kumar et al. |
| 10,002,026 | B1 | 6/2018 | Wagner |
| 10,002,036 | B2 | 6/2018 | Fuchs et al. |
| 10,013,267 | B1 | 7/2018 | Wagner et al. |
| 10,042,660 | B2 | 8/2018 | Wagner et al. |
| 10,048,974 | B1 | 8/2018 | Wagner et al. |
| 10,061,613 | B1 | 8/2018 | Brooker et al. |
| 10,067,801 | B1 | 9/2018 | Wagner |
| 10,102,040 | B2 | 10/2018 | Marriner et al. |
| 10,108,443 | B2 | 10/2018 | Wagner et al. |
| 10,139,876 | B2 | 11/2018 | Lu et al. |
| 10,140,137 | B2 | 11/2018 | Wagner |
| 10,146,635 | B1 | 12/2018 | Chai et al. |
| 10,162,655 | B2 | 12/2018 | Tuch et al. |
| 10,162,672 | B2 | 12/2018 | Wagner et al. |
| 10,162,688 | B2 | 12/2018 | Wagner |
| 10,191,861 | B1 | 1/2019 | Steinberg |
| 10,193,839 | B2 | 1/2019 | Tandon et al. |
| 10,198,298 | B2 | 2/2019 | Bishop et al. |
| 10,203,990 | B2 | 2/2019 | Wagner et al. |
| 10,248,467 | B2 | 4/2019 | Wisniewski et al. |
| 10,255,090 | B2 | 4/2019 | Tuch et al. |
| 10,277,708 | B2 | 4/2019 | Wagner et al. |
| 10,303,492 | B1 | 5/2019 | Wagner et al. |
| 10,331,462 | B1 | 6/2019 | Varda et al. |
| 10,346,625 | B2 | 7/2019 | Anderson et al. |
| 10,353,678 | B1 | 7/2019 | Wagner |
| 10,353,746 | B2 | 7/2019 | Reque et al. |
| 10,360,025 | B2 | 7/2019 | Foskett et al. |
| 10,360,067 | B1 | 7/2019 | Wagner |
| 10,365,985 | B2 | 7/2019 | Wagner |
| 10,387,177 | B2 | 8/2019 | Wagner et al. |
| 10,402,231 | B2 | 9/2019 | Marriner et al. |
| 10,423,158 | B1 | 9/2019 | Hadlich |
| 10,437,629 | B2 | 10/2019 | Wagner et al. |
| 10,445,140 | B1 | 10/2019 | Sagar et al. |
| 10,459,822 | B1 | 10/2019 | Gondi |
| 10,496,547 | B1 | 12/2019 | Naenko et al. |
| 10,503,626 | B2 | 12/2019 | Idicula et al. |
| 10,528,390 | B2 | 1/2020 | Brooker et al. |
| 10,531,226 | B1 | 1/2020 | Wang et al. |
| 10,552,193 | B2 | 2/2020 | Wagner et al. |
| 10,552,442 | B1 | 2/2020 | Lusk et al. |
| 10,564,946 | B1 | 2/2020 | Wagner et al. |
| 10,567,492 | B1 * | 2/2020 | Natarajan ........... H04L 63/0807 |
| 10,572,375 | B1 | 2/2020 | Wagner |
| 10,592,269 | B2 | 3/2020 | Wagner et al. |
| 10,608,973 | B2 | 3/2020 | Kuo et al. |
| 10,615,984 | B1 | 4/2020 | Wang |
| 10,623,476 | B2 | 4/2020 | Thompson |
| 10,637,817 | B2 | 4/2020 | Kuo et al. |
| 10,649,749 | B1 | 5/2020 | Brooker et al. |
| 10,649,792 | B1 | 5/2020 | Kulchytskyy et al. |
| 10,650,156 | B2 | 5/2020 | Anderson et al. |
| 10,652,350 | B2 | 5/2020 | Wozniak |
| 10,678,522 | B1 | 6/2020 | Yerramreddy et al. |
| 10,686,605 | B2 | 6/2020 | Chhabra et al. |
| 10,691,498 | B2 | 6/2020 | Wagner |
| 10,713,080 | B1 | 7/2020 | Brooker et al. |
| 10,719,367 | B1 | 7/2020 | Kim et al. |
| 10,725,752 | B1 | 7/2020 | Wagner et al. |
| 10,725,826 | B1 | 7/2020 | Sagar et al. |
| 10,732,951 | B2 | 8/2020 | Jayanthi et al. |
| 10,733,085 | B1 | 8/2020 | Wagner |
| 10,754,701 | B1 | 8/2020 | Wagner |
| 10,776,091 | B1 | 9/2020 | Wagner et al. |
| 10,776,171 | B2 | 9/2020 | Wagner et al. |
| 10,817,331 | B2 | 10/2020 | Mullen et al. |
| 10,817,346 | B1 | 10/2020 | Culp et al. |
| 10,824,484 | B2 | 11/2020 | Wagner et al. |
| 10,831,898 | B1 | 11/2020 | Wagner |
| 10,846,117 | B1 | 11/2020 | Steinberg |
| 10,853,112 | B2 | 12/2020 | Wagner et al. |
| 10,853,115 | B2 | 12/2020 | Mullen et al. |
| 10,884,722 | B2 | 1/2021 | Brooker et al. |
| 10,884,787 | B1 | 1/2021 | Wagner et al. |
| 10,884,802 | B2 | 1/2021 | Wagner et al. |
| 10,884,812 | B2 | 1/2021 | Brooker et al. |
| 10,891,145 | B2 | 1/2021 | Wagner et al. |
| 10,915,371 | B2 | 2/2021 | Wagner et al. |
| 10,942,795 | B1 | 3/2021 | Yanacek et al. |
| 10,949,237 | B2 | 3/2021 | Piwonka et al. |
| 10,956,185 | B2 | 3/2021 | Wagner |
| 10,956,244 | B1 | 3/2021 | Cho |
| 11,010,188 | B1 | 5/2021 | Brooker et al. |
| 11,016,815 | B2 | 5/2021 | Wisniewski et al. |
| 11,044,198 | B1 | 6/2021 | Ahn et al. |
| 11,082,333 | B1 | 8/2021 | Lam et al. |
| 11,095,706 | B1 | 8/2021 | Ankam et al. |
| 11,099,870 | B1 | 8/2021 | Brooker et al. |
| 11,099,917 | B2 | 8/2021 | Hussels et al. |
| 11,115,404 | B2 | 9/2021 | Siefker et al. |
| 11,119,809 | B1 | 9/2021 | Brooker et al. |
| 11,119,813 | B1 | 9/2021 | Kasaragod |
| 11,119,826 | B2 | 9/2021 | Yanacek et al. |
| 11,126,469 | B2 | 9/2021 | Reque et al. |
| 11,132,213 | B1 | 9/2021 | Wagner et al. |
| 11,146,569 | B1 | 10/2021 | Brooker et al. |
| 11,159,528 | B2 | 10/2021 | Siefker et al. |
| 11,188,391 | B1 | 11/2021 | Sule |
| 11,190,609 | B2 | 11/2021 | Siefker et al. |
| 11,231,955 | B1 | 1/2022 | Shahane et al. |
| 11,243,819 | B1 | 2/2022 | Wagner |
| 11,243,953 | B2 | 2/2022 | Wagner et al. |
| 11,263,034 | B2 | 3/2022 | Wagner et al. |
| 11,327,992 | B1 | 5/2022 | Batsakis et al. |
| 11,354,169 | B2 | 6/2022 | Marriner et al. |
| 11,360,793 | B2 | 6/2022 | Wagner et al. |
| 11,392,497 | B1 | 7/2022 | Brooker et al. |
| 11,461,124 | B2 | 10/2022 | Wagner et al. |
| 11,467,890 | B2 | 10/2022 | Wagner |
| 11,550,713 | B1 | 1/2023 | Piwonka et al. |
| 11,561,811 | B2 | 1/2023 | Wagner |
| 11,593,270 | B1 | 2/2023 | Brooker et al. |

(56) References Cited

U.S. PATENT DOCUMENTS

| | | |
|---|---|---|
| 11,714,675 B2 | 8/2023 | Brooker et al. |
| 11,836,516 B2 | 12/2023 | Brooker et al. |
| 11,861,386 B1 | 1/2024 | Varun Mukesh et al. |
| 11,875,173 B2 | 1/2024 | Mullen et al. |
| 11,943,093 B1 | 3/2024 | Brooker et al. |
| 11,968,280 B1 | 4/2024 | Sood et al. |
| 12,015,603 B2 | 6/2024 | Danilov et al. |
| 2001/0044817 A1 | 11/2001 | Asano et al. |
| 2002/0083012 A1 | 6/2002 | Bush et al. |
| 2002/0120685 A1 | 8/2002 | Srivastava et al. |
| 2002/0172273 A1 | 11/2002 | Baker et al. |
| 2003/0071842 A1 | 4/2003 | King et al. |
| 2003/0084434 A1 | 5/2003 | Ren |
| 2003/0126200 A1* | 7/2003 | Wolff ................. G06F 9/52 709/218 |
| 2003/0149801 A1 | 8/2003 | Kushnirskiy |
| 2003/0177186 A1 | 9/2003 | Goodman et al. |
| 2003/0191795 A1 | 10/2003 | Bernardin et al. |
| 2003/0208569 A1 | 11/2003 | O'Brien et al. |
| 2003/0229794 A1 | 12/2003 | James, II et al. |
| 2004/0003087 A1 | 1/2004 | Chambliss et al. |
| 2004/0019886 A1 | 1/2004 | Berent et al. |
| 2004/0044721 A1 | 3/2004 | Song et al. |
| 2004/0049768 A1 | 3/2004 | Matsuyama et al. |
| 2004/0098154 A1 | 5/2004 | McCarthy |
| 2004/0158551 A1 | 8/2004 | Santosuosso |
| 2004/0205493 A1 | 10/2004 | Simpson et al. |
| 2004/0249947 A1 | 12/2004 | Novaes et al. |
| 2004/0268358 A1 | 12/2004 | Darling et al. |
| 2005/0027611 A1 | 2/2005 | Wharton |
| 2005/0044301 A1 | 2/2005 | Vasilevsky et al. |
| 2005/0120160 A1 | 6/2005 | Plouffe et al. |
| 2005/0132167 A1 | 6/2005 | Longobardi |
| 2005/0132368 A1 | 6/2005 | Sexton et al. |
| 2005/0149535 A1 | 7/2005 | Frey et al. |
| 2005/0193113 A1 | 9/2005 | Kokusho et al. |
| 2005/0193283 A1 | 9/2005 | Reinhardt et al. |
| 2005/0237948 A1 | 10/2005 | Wan et al. |
| 2005/0257051 A1 | 11/2005 | Richard |
| 2005/0262183 A1 | 11/2005 | Colrain et al. |
| 2005/0262512 A1 | 11/2005 | Schmidt et al. |
| 2006/0010440 A1 | 1/2006 | Anderson et al. |
| 2006/0015740 A1 | 1/2006 | Kramer |
| 2006/0031448 A1* | 2/2006 | Chu ................. G06F 9/4405 709/223 |
| 2006/0036941 A1 | 2/2006 | Neil |
| 2006/0080678 A1 | 4/2006 | Bailey et al. |
| 2006/0123066 A1 | 6/2006 | Jacobs et al. |
| 2006/0129684 A1 | 6/2006 | Datta |
| 2006/0155800 A1 | 7/2006 | Matsumoto |
| 2006/0168174 A1 | 7/2006 | Gebhart et al. |
| 2006/0184669 A1 | 8/2006 | Vaidyanathan et al. |
| 2006/0200668 A1 | 9/2006 | Hybre et al. |
| 2006/0212332 A1 | 9/2006 | Jackson |
| 2006/0218601 A1 | 9/2006 | Michel |
| 2006/0242647 A1 | 10/2006 | Kimbrel et al. |
| 2006/0242709 A1 | 10/2006 | Seinfeld et al. |
| 2006/0248195 A1 | 11/2006 | Toumura et al. |
| 2006/0259763 A1 | 11/2006 | Cooperstein et al. |
| 2006/0282330 A1 | 12/2006 | Frank et al. |
| 2006/0288120 A1 | 12/2006 | Hoshino et al. |
| 2007/0033085 A1 | 2/2007 | Johnson |
| 2007/0050779 A1 | 3/2007 | Hayashi |
| 2007/0067321 A1 | 3/2007 | Bissett et al. |
| 2007/0076244 A1 | 4/2007 | Suzuki et al. |
| 2007/0094396 A1 | 4/2007 | Takano et al. |
| 2007/0101325 A1 | 5/2007 | Bystricky et al. |
| 2007/0112864 A1 | 5/2007 | Ben-Natan |
| 2007/0130341 A1 | 6/2007 | Ma |
| 2007/0174419 A1 | 7/2007 | O'Connell et al. |
| 2007/0180449 A1 | 8/2007 | Croft et al. |
| 2007/0180450 A1 | 8/2007 | Croft et al. |
| 2007/0180493 A1 | 8/2007 | Croft et al. |
| 2007/0186212 A1 | 8/2007 | Mazzaferri et al. |
| 2007/0192082 A1 | 8/2007 | Gaos et al. |
| 2007/0192329 A1 | 8/2007 | Croft et al. |
| 2007/0198656 A1 | 8/2007 | Mazzaferri et al. |
| 2007/0199000 A1 | 8/2007 | Shekhel et al. |
| 2007/0220009 A1 | 9/2007 | Morris et al. |
| 2007/0226700 A1 | 9/2007 | Gal et al. |
| 2007/0240160 A1 | 10/2007 | Paterson-Jones |
| 2007/0255604 A1 | 11/2007 | Seelig |
| 2007/0300297 A1 | 12/2007 | Dawson et al. |
| 2008/0028409 A1 | 1/2008 | Cherkasova et al. |
| 2008/0052401 A1 | 2/2008 | Bugenhagen et al. |
| 2008/0052725 A1 | 2/2008 | Stoodley et al. |
| 2008/0082977 A1 | 4/2008 | Araujo et al. |
| 2008/0104247 A1 | 5/2008 | Venkatakrishnan et al. |
| 2008/0104608 A1 | 5/2008 | Hyser et al. |
| 2008/0115143 A1 | 5/2008 | Shimizu et al. |
| 2008/0126110 A1 | 5/2008 | Haeberle et al. |
| 2008/0126486 A1 | 5/2008 | Heist |
| 2008/0127125 A1 | 5/2008 | Anckaert et al. |
| 2008/0147893 A1 | 6/2008 | Marripudi et al. |
| 2008/0178278 A1 | 7/2008 | Grinstein et al. |
| 2008/0184340 A1 | 7/2008 | Nakamura et al. |
| 2008/0189468 A1 | 8/2008 | Schmidt et al. |
| 2008/0195369 A1 | 8/2008 | Duyanovich et al. |
| 2008/0201568 A1 | 8/2008 | Quinn et al. |
| 2008/0201711 A1 | 8/2008 | Amir Husain |
| 2008/0209423 A1 | 8/2008 | Hirai |
| 2008/0244547 A1 | 10/2008 | Wintergerst et al. |
| 2008/0288940 A1 | 11/2008 | Adams et al. |
| 2008/0307098 A1 | 12/2008 | Kelly |
| 2009/0006897 A1 | 1/2009 | Sarsfield |
| 2009/0013153 A1 | 1/2009 | Hilton |
| 2009/0018892 A1* | 1/2009 | Grey ................. G06Q 30/02 705/400 |
| 2009/0025009 A1 | 1/2009 | Brunswig et al. |
| 2009/0034537 A1 | 2/2009 | Colrain et al. |
| 2009/0055810 A1 | 2/2009 | Kondur |
| 2009/0055829 A1 | 2/2009 | Gibson |
| 2009/0070355 A1 | 3/2009 | Cadarette et al. |
| 2009/0077569 A1 | 3/2009 | Appleton et al. |
| 2009/0125902 A1 | 5/2009 | Ghosh et al. |
| 2009/0158275 A1 | 6/2009 | Wang et al. |
| 2009/0158407 A1 | 6/2009 | Nicodemus et al. |
| 2009/0177860 A1 | 7/2009 | Zhu et al. |
| 2009/0183162 A1 | 7/2009 | Kindel et al. |
| 2009/0193410 A1 | 7/2009 | Arthursson et al. |
| 2009/0198769 A1 | 8/2009 | Keller et al. |
| 2009/0204960 A1 | 8/2009 | Ben-yehuda et al. |
| 2009/0204964 A1 | 8/2009 | Foley et al. |
| 2009/0222922 A1 | 9/2009 | Sidiroglou et al. |
| 2009/0271472 A1 | 10/2009 | Scheifler et al. |
| 2009/0288084 A1 | 11/2009 | Astete et al. |
| 2009/0300151 A1 | 12/2009 | Friedman et al. |
| 2009/0300599 A1 | 12/2009 | Piotrowski |
| 2009/0307430 A1 | 12/2009 | Bruening et al. |
| 2010/0023940 A1 | 1/2010 | Iwamatsu et al. |
| 2010/0031274 A1 | 2/2010 | Sim-Tang |
| 2010/0031325 A1 | 2/2010 | Maigne et al. |
| 2010/0036925 A1 | 2/2010 | Haffner |
| 2010/0037031 A1* | 2/2010 | DeSantis ............. G06F 3/0619 711/162 |
| 2010/0058294 A1 | 3/2010 | Best et al. |
| 2010/0058342 A1 | 3/2010 | Machida |
| 2010/0058351 A1 | 3/2010 | Yahagi |
| 2010/0064299 A1 | 3/2010 | Kacin et al. |
| 2010/0070678 A1 | 3/2010 | Zhang et al. |
| 2010/0070725 A1 | 3/2010 | Prahlad et al. |
| 2010/0083048 A1 | 4/2010 | Calinoiu et al. |
| 2010/0083248 A1 | 4/2010 | Wood et al. |
| 2010/0094816 A1 | 4/2010 | Groves, Jr. et al. |
| 2010/0106926 A1 | 4/2010 | Kandasamy et al. |
| 2010/0114825 A1 | 5/2010 | Siddegowda |
| 2010/0115098 A1 | 5/2010 | De Baer et al. |
| 2010/0122343 A1 | 5/2010 | Ghosh |
| 2010/0131936 A1 | 5/2010 | Cheriton |
| 2010/0131959 A1 | 5/2010 | Spiers et al. |
| 2010/0146004 A1 | 6/2010 | Sim-Tang |
| 2010/0169477 A1* | 7/2010 | Stienhans ............. G06F 9/5083 709/224 |
| 2010/0186011 A1 | 7/2010 | Magenheimer |

(56) References Cited

U.S. PATENT DOCUMENTS

| | | |
|---|---|---|
| 2010/0198972 A1 | 8/2010 | Umbehocker |
| 2010/0199285 A1 | 8/2010 | Medovich |
| 2010/0257116 A1 | 10/2010 | Mehta et al. |
| 2010/0257269 A1 | 10/2010 | Clark |
| 2010/0269109 A1 | 10/2010 | Cartales |
| 2010/0298011 A1 | 11/2010 | Pelley et al. |
| 2010/0299541 A1 | 11/2010 | Ishikawa et al. |
| 2010/0312871 A1 | 12/2010 | Desantis et al. |
| 2010/0325727 A1 | 12/2010 | Neystadt et al. |
| 2010/0329149 A1 | 12/2010 | Singh et al. |
| 2010/0329643 A1 | 12/2010 | Kuang |
| 2011/0004687 A1 | 1/2011 | Takemura |
| 2011/0010690 A1 | 1/2011 | Howard et al. |
| 2011/0010722 A1 | 1/2011 | Matsuyama |
| 2011/0023026 A1 | 1/2011 | Oza |
| 2011/0029970 A1 | 2/2011 | Arasaratnam |
| 2011/0029984 A1 | 2/2011 | Norman et al. |
| 2011/0035785 A1 | 2/2011 | Mihara |
| 2011/0040812 A1 | 2/2011 | Phillips |
| 2011/0055378 A1 | 3/2011 | Ferris et al. |
| 2011/0055396 A1 | 3/2011 | DeHaan |
| 2011/0055683 A1 | 3/2011 | Jiang |
| 2011/0078679 A1 | 3/2011 | Bozek et al. |
| 2011/0099204 A1 | 4/2011 | Thaler |
| 2011/0099551 A1 | 4/2011 | Fahrig et al. |
| 2011/0131572 A1 | 6/2011 | Elyashev et al. |
| 2011/0134761 A1 | 6/2011 | Smith |
| 2011/0141124 A1 | 6/2011 | Halls et al. |
| 2011/0153541 A1 | 6/2011 | Koch et al. |
| 2011/0153727 A1 | 6/2011 | Li |
| 2011/0153838 A1 | 6/2011 | Belkine et al. |
| 2011/0154353 A1 | 6/2011 | Theroux et al. |
| 2011/0173637 A1 | 7/2011 | Brandwine et al. |
| 2011/0179162 A1 | 7/2011 | Mayo et al. |
| 2011/0184993 A1 | 7/2011 | Chawla et al. |
| 2011/0208866 A1 | 8/2011 | Marmolejo-Meillon et al. |
| 2011/0225277 A1 | 9/2011 | Freimuth et al. |
| 2011/0231680 A1 | 9/2011 | Padmanabhan et al. |
| 2011/0247005 A1 | 10/2011 | Benedetti et al. |
| 2011/0258603 A1* | 10/2011 | Wisnovsky ......... G06F 11/3664 717/125 |
| 2011/0265067 A1 | 10/2011 | Schulte et al. |
| 2011/0265069 A1* | 10/2011 | Fee ..................... G06F 8/41 717/151 |
| 2011/0265164 A1 | 10/2011 | Lucovsky |
| 2011/0271276 A1 | 11/2011 | Ashok et al. |
| 2011/0276945 A1 | 11/2011 | Chasman et al. |
| 2011/0276963 A1 | 11/2011 | Wu et al. |
| 2011/0296412 A1 | 12/2011 | Banga et al. |
| 2011/0314465 A1 | 12/2011 | Smith et al. |
| 2011/0321033 A1 | 12/2011 | Kelkar et al. |
| 2011/0321051 A1 | 12/2011 | Rastogi |
| 2012/0011496 A1 | 1/2012 | Shimamura |
| 2012/0011511 A1 | 1/2012 | Horvitz et al. |
| 2012/0016721 A1 | 1/2012 | Weinman |
| 2012/0041970 A1 | 2/2012 | Ghosh et al. |
| 2012/0054744 A1 | 3/2012 | Singh et al. |
| 2012/0060207 A1 | 3/2012 | Mardikar et al. |
| 2012/0072762 A1 | 3/2012 | Atchison et al. |
| 2012/0072914 A1 | 3/2012 | Ota |
| 2012/0072920 A1 | 3/2012 | Kawamura |
| 2012/0079004 A1 | 3/2012 | Herman |
| 2012/0096271 A1 | 4/2012 | Ramarathinam et al. |
| 2012/0096468 A1* | 4/2012 | Chakravorty ............. G06F 9/50 718/103 |
| 2012/0102307 A1 | 4/2012 | Wong |
| 2012/0102333 A1 | 4/2012 | Wong |
| 2012/0102481 A1 | 4/2012 | Mani et al. |
| 2012/0102493 A1 | 4/2012 | Allen et al. |
| 2012/0110155 A1 | 5/2012 | Adlung et al. |
| 2012/0110164 A1 | 5/2012 | Frey et al. |
| 2012/0110570 A1 | 5/2012 | Jacobson et al. |
| 2012/0110588 A1 | 5/2012 | Bieswanger et al. |
| 2012/0110603 A1 | 5/2012 | Kaneko et al. |
| 2012/0124563 A1 | 5/2012 | Chung et al. |
| 2012/0131379 A1 | 5/2012 | Tameshige et al. |
| 2012/0144290 A1 | 6/2012 | Goldman et al. |
| 2012/0166624 A1 | 6/2012 | Suit et al. |
| 2012/0173709 A1 | 7/2012 | Li et al. |
| 2012/0192184 A1 | 7/2012 | Burckart et al. |
| 2012/0197795 A1 | 8/2012 | Campbell et al. |
| 2012/0197958 A1 | 8/2012 | Nightingale et al. |
| 2012/0198442 A1 | 8/2012 | Kashyap et al. |
| 2012/0198514 A1 | 8/2012 | McCune et al. |
| 2012/0204164 A1 | 8/2012 | Castanos et al. |
| 2012/0209947 A1* | 8/2012 | Glaser ................. G06F 9/5027 709/217 |
| 2012/0222038 A1 | 8/2012 | Katragadda et al. |
| 2012/0233464 A1 | 9/2012 | Miller et al. |
| 2012/0254193 A1 | 10/2012 | Chattopadhyay et al. |
| 2012/0324052 A1 | 12/2012 | Paleja et al. |
| 2012/0324236 A1 | 12/2012 | Srivastava et al. |
| 2012/0331113 A1 | 12/2012 | Jain et al. |
| 2013/0014101 A1 | 1/2013 | Ballani et al. |
| 2013/0042234 A1 | 2/2013 | DeLuca et al. |
| 2013/0054804 A1 | 2/2013 | Jana et al. |
| 2013/0054927 A1 | 2/2013 | Raj et al. |
| 2013/0055262 A1 | 2/2013 | Lubsey et al. |
| 2013/0061208 A1 | 3/2013 | Tsao et al. |
| 2013/0061212 A1 | 3/2013 | Krause et al. |
| 2013/0061220 A1 | 3/2013 | Gnanasambandam et al. |
| 2013/0067484 A1 | 3/2013 | Sonoda et al. |
| 2013/0067494 A1 | 3/2013 | Srour et al. |
| 2013/0080641 A1 | 3/2013 | Lui et al. |
| 2013/0091387 A1 | 4/2013 | Bohnet et al. |
| 2013/0097601 A1 | 4/2013 | Podvratnik et al. |
| 2013/0111032 A1 | 5/2013 | Alapati et al. |
| 2013/0111469 A1 | 5/2013 | B et al. |
| 2013/0124807 A1 | 5/2013 | Nielsen et al. |
| 2013/0132283 A1 | 5/2013 | Hayhow et al. |
| 2013/0132942 A1 | 5/2013 | Wang |
| 2013/0132953 A1 | 5/2013 | Chuang et al. |
| 2013/0139152 A1 | 5/2013 | Chang et al. |
| 2013/0139166 A1 | 5/2013 | Zhang et al. |
| 2013/0145354 A1 | 6/2013 | Bruening et al. |
| 2013/0151587 A1 | 6/2013 | Takeshima et al. |
| 2013/0151648 A1 | 6/2013 | Luna |
| 2013/0151684 A1 | 6/2013 | Forsman et al. |
| 2013/0152047 A1 | 6/2013 | Moorthi et al. |
| 2013/0167147 A1 | 6/2013 | Corrie et al. |
| 2013/0179574 A1 | 7/2013 | Calder et al. |
| 2013/0179881 A1 | 7/2013 | Calder et al. |
| 2013/0179894 A1 | 7/2013 | Calder et al. |
| 2013/0179895 A1 | 7/2013 | Calder et al. |
| 2013/0181998 A1 | 7/2013 | Malakapalli et al. |
| 2013/0185719 A1 | 7/2013 | Kar et al. |
| 2013/0185729 A1 | 7/2013 | Vasic et al. |
| 2013/0191847 A1 | 7/2013 | Sirota et al. |
| 2013/0191924 A1 | 7/2013 | Tedesco |
| 2013/0198319 A1 | 8/2013 | Shen et al. |
| 2013/0198743 A1 | 8/2013 | Kruglick |
| 2013/0198748 A1 | 8/2013 | Sharp et al. |
| 2013/0198763 A1 | 8/2013 | Kunze et al. |
| 2013/0205092 A1 | 8/2013 | Roy et al. |
| 2013/0205114 A1 | 8/2013 | Badam et al. |
| 2013/0219390 A1 | 8/2013 | Lee et al. |
| 2013/0227097 A1 | 8/2013 | Yasuda et al. |
| 2013/0227534 A1 | 8/2013 | Ike et al. |
| 2013/0227563 A1 | 8/2013 | McGrath |
| 2013/0227641 A1 | 8/2013 | White et al. |
| 2013/0227710 A1 | 8/2013 | Barak et al. |
| 2013/0232190 A1 | 9/2013 | Miller et al. |
| 2013/0232480 A1 | 9/2013 | Winterfeldt et al. |
| 2013/0239125 A1 | 9/2013 | Iorio |
| 2013/0246944 A1 | 9/2013 | Pandiyan et al. |
| 2013/0262556 A1 | 10/2013 | Xu et al. |
| 2013/0263117 A1 | 10/2013 | Konik et al. |
| 2013/0274006 A1 | 10/2013 | Hudlow et al. |
| 2013/0275376 A1 | 10/2013 | Hudlow et al. |
| 2013/0275958 A1 | 10/2013 | Ivanov et al. |
| 2013/0275969 A1 | 10/2013 | Dimitrov |
| 2013/0275975 A1 | 10/2013 | Masuda et al. |
| 2013/0283141 A1 | 10/2013 | Stevenson et al. |
| 2013/0283176 A1 | 10/2013 | Hoole et al. |

(56) References Cited

U.S. PATENT DOCUMENTS

| | | |
|---|---|---|
| 2013/0290538 A1 | 10/2013 | Gmach et al. |
| 2013/0291087 A1 | 10/2013 | Kailash et al. |
| 2013/0297964 A1 | 11/2013 | Hegdal et al. |
| 2013/0298183 A1 | 11/2013 | McGrath et al. |
| 2013/0311650 A1 | 11/2013 | Brandwine et al. |
| 2013/0326506 A1 | 12/2013 | McGrath et al. |
| 2013/0326507 A1 | 12/2013 | McGrath et al. |
| 2013/0332660 A1 | 12/2013 | Talagala et al. |
| 2013/0339950 A1 | 12/2013 | Ramarathinam et al. |
| 2013/0346470 A1 | 12/2013 | Obstfeld et al. |
| 2013/0346946 A1 | 12/2013 | Pinnix |
| 2013/0346952 A1 | 12/2013 | Huang et al. |
| 2013/0346964 A1 | 12/2013 | Nobuoka et al. |
| 2013/0346987 A1 | 12/2013 | Raney et al. |
| 2013/0346994 A1 | 12/2013 | Chen et al. |
| 2013/0347095 A1 | 12/2013 | Barjatiya et al. |
| 2014/0007097 A1 | 1/2014 | Chin et al. |
| 2014/0019523 A1 | 1/2014 | Heymann et al. |
| 2014/0019735 A1 | 1/2014 | Menon et al. |
| 2014/0019965 A1 | 1/2014 | Neuse et al. |
| 2014/0019966 A1 | 1/2014 | Neuse et al. |
| 2014/0040343 A1 | 2/2014 | Nickolov et al. |
| 2014/0040857 A1 | 2/2014 | Trinchini et al. |
| 2014/0040880 A1 | 2/2014 | Brownlow et al. |
| 2014/0047437 A1 | 2/2014 | Wu et al. |
| 2014/0058871 A1 | 2/2014 | Marr et al. |
| 2014/0059209 A1 | 2/2014 | Alnoor |
| 2014/0059226 A1 | 2/2014 | Messerli et al. |
| 2014/0059552 A1 | 2/2014 | Cunningham et al. |
| 2014/0068568 A1 | 3/2014 | Wisnovsky |
| 2014/0068608 A1 | 3/2014 | Kulkarni |
| 2014/0068611 A1 | 3/2014 | McGrath et al. |
| 2014/0073300 A1 | 3/2014 | Leeder et al. |
| 2014/0081984 A1 | 3/2014 | Sitsky et al. |
| 2014/0082165 A1 | 3/2014 | Marr et al. |
| 2014/0082201 A1 | 3/2014 | Shankari et al. |
| 2014/0101643 A1 | 4/2014 | Inoue |
| 2014/0101649 A1 | 4/2014 | Kamble et al. |
| 2014/0108722 A1 | 4/2014 | Lipchuk et al. |
| 2014/0109087 A1 | 4/2014 | Jujare et al. |
| 2014/0109088 A1 | 4/2014 | Dournov et al. |
| 2014/0129667 A1 | 5/2014 | Ozawa |
| 2014/0130040 A1 | 5/2014 | Lemanski |
| 2014/0137110 A1 | 5/2014 | Engle et al. |
| 2014/0164551 A1 | 6/2014 | Resch et al. |
| 2014/0173614 A1 | 6/2014 | Konik et al. |
| 2014/0173616 A1 | 6/2014 | Bird et al. |
| 2014/0180862 A1 | 6/2014 | Certain et al. |
| 2014/0189677 A1 | 7/2014 | Curzi et al. |
| 2014/0189704 A1 | 7/2014 | Narvaez et al. |
| 2014/0201735 A1 | 7/2014 | Kannan et al. |
| 2014/0207912 A1 | 7/2014 | Thibeault |
| 2014/0214752 A1 | 7/2014 | Rash et al. |
| 2014/0215073 A1 | 7/2014 | Dow et al. |
| 2014/0229221 A1 | 8/2014 | Shih et al. |
| 2014/0229942 A1 | 8/2014 | Wiseman et al. |
| 2014/0245297 A1 | 8/2014 | Hackett |
| 2014/0258777 A1 | 9/2014 | Cheriton |
| 2014/0279581 A1 | 9/2014 | Devereaux |
| 2014/0280325 A1 | 9/2014 | Krishnamurthy et al. |
| 2014/0282418 A1 | 9/2014 | Wood et al. |
| 2014/0282559 A1 | 9/2014 | Verduzco et al. |
| 2014/0282615 A1 | 9/2014 | Cavage et al. |
| 2014/0282629 A1 | 9/2014 | Gupta et al. |
| 2014/0283045 A1 | 9/2014 | Brandwine et al. |
| 2014/0289286 A1 | 9/2014 | Gusak |
| 2014/0298295 A1 | 10/2014 | Overbeck |
| 2014/0304246 A1 | 10/2014 | Helmich et al. |
| 2014/0304698 A1 | 10/2014 | Chigurapati et al. |
| 2014/0304815 A1 | 10/2014 | Maeda |
| 2014/0317617 A1 | 10/2014 | O'Donnell |
| 2014/0330936 A1 | 11/2014 | Factor et al. |
| 2014/0331222 A1 | 11/2014 | Zheng |
| 2014/0337953 A1 | 11/2014 | Banatwala et al. |
| 2014/0344457 A1 | 11/2014 | Bruno, Jr. et al. |
| 2014/0344736 A1 | 11/2014 | Ryman et al. |
| 2014/0351674 A1 | 11/2014 | Grube et al. |
| 2014/0359093 A1 | 12/2014 | Raju et al. |
| 2014/0359608 A1 | 12/2014 | Tsirkin et al. |
| 2014/0365781 A1 | 12/2014 | Dmitrienko et al. |
| 2014/0372489 A1 | 12/2014 | Jaiswal et al. |
| 2014/0372533 A1 | 12/2014 | Fu et al. |
| 2014/0380085 A1 | 12/2014 | Rash et al. |
| 2015/0006487 A1 | 1/2015 | Yang et al. |
| 2015/0025989 A1 | 1/2015 | Dunstan |
| 2015/0033241 A1 | 1/2015 | Jackson et al. |
| 2015/0039891 A1 | 2/2015 | Ignatchenko et al. |
| 2015/0040229 A1 | 2/2015 | Chan et al. |
| 2015/0046926 A1 | 2/2015 | Kenchammana-Hosekote et al. |
| 2015/0046971 A1 | 2/2015 | Huh et al. |
| 2015/0052258 A1 | 2/2015 | Johnson et al. |
| 2015/0058914 A1 | 2/2015 | Yadav |
| 2015/0067019 A1* | 3/2015 | Balko ............... H04L 67/10 709/202 |
| 2015/0067830 A1 | 3/2015 | Johansson et al. |
| 2015/0074659 A1 | 3/2015 | Madsen et al. |
| 2015/0074661 A1 | 3/2015 | Kothari et al. |
| 2015/0074662 A1 | 3/2015 | Saladi et al. |
| 2015/0074675 A1 | 3/2015 | Qi et al. |
| 2015/0081885 A1 | 3/2015 | Thomas et al. |
| 2015/0095822 A1 | 4/2015 | Feis et al. |
| 2015/0106805 A1* | 4/2015 | Melander ............. G06F 9/5072 718/1 |
| 2015/0120928 A1 | 4/2015 | Gummaraju et al. |
| 2015/0121391 A1 | 4/2015 | Wang |
| 2015/0134626 A1 | 5/2015 | Theimer et al. |
| 2015/0135287 A1 | 5/2015 | Medeiros et al. |
| 2015/0142747 A1 | 5/2015 | Zou |
| 2015/0142952 A1 | 5/2015 | Bragstad et al. |
| 2015/0143374 A1 | 5/2015 | Banga et al. |
| 2015/0143381 A1 | 5/2015 | Chin et al. |
| 2015/0146716 A1 | 5/2015 | Olivier et al. |
| 2015/0154046 A1 | 6/2015 | Farkas et al. |
| 2015/0161384 A1 | 6/2015 | Gu et al. |
| 2015/0163231 A1 | 6/2015 | Sobko et al. |
| 2015/0178019 A1 | 6/2015 | Hegdal et al. |
| 2015/0178110 A1 | 6/2015 | Li et al. |
| 2015/0186129 A1 | 7/2015 | Apte et al. |
| 2015/0188775 A1 | 7/2015 | Van Der Walt et al. |
| 2015/0199218 A1 | 7/2015 | Wilson et al. |
| 2015/0205596 A1 | 7/2015 | Hiltegen et al. |
| 2015/0206139 A1 | 7/2015 | Lea |
| 2015/0212818 A1 | 7/2015 | Gschwind et al. |
| 2015/0227598 A1 | 8/2015 | Hahn et al. |
| 2015/0229645 A1 | 8/2015 | Keith et al. |
| 2015/0235144 A1 | 8/2015 | Gusev et al. |
| 2015/0242225 A1 | 8/2015 | Muller et al. |
| 2015/0254248 A1 | 9/2015 | Burns et al. |
| 2015/0256514 A1 | 9/2015 | Laivand et al. |
| 2015/0256621 A1 | 9/2015 | Noda et al. |
| 2015/0261578 A1 | 9/2015 | Greden et al. |
| 2015/0264014 A1 | 9/2015 | Budhani et al. |
| 2015/0269494 A1 | 9/2015 | Kardes et al. |
| 2015/0271073 A1 | 9/2015 | Saladi et al. |
| 2015/0271280 A1 | 9/2015 | Zhang et al. |
| 2015/0289220 A1 | 10/2015 | Kim et al. |
| 2015/0309923 A1 | 10/2015 | Iwata et al. |
| 2015/0319160 A1 | 11/2015 | Ferguson et al. |
| 2015/0319174 A1 | 11/2015 | Hayton et al. |
| 2015/0324174 A1 | 11/2015 | Bromley et al. |
| 2015/0324182 A1 | 11/2015 | Barros et al. |
| 2015/0324210 A1 | 11/2015 | Carlson |
| 2015/0324229 A1 | 11/2015 | Valine |
| 2015/0332048 A1 | 11/2015 | Mooring et al. |
| 2015/0332195 A1 | 11/2015 | Jue |
| 2015/0334173 A1 | 11/2015 | Coulmeau et al. |
| 2015/0350701 A1 | 12/2015 | Lemus et al. |
| 2015/0356294 A1 | 12/2015 | Tan et al. |
| 2015/0363181 A1 | 12/2015 | Alberti et al. |
| 2015/0363304 A1 | 12/2015 | Nagamalla et al. |
| 2015/0370560 A1 | 12/2015 | Tan et al. |
| 2015/0370591 A1 | 12/2015 | Tuch et al. |
| 2015/0370592 A1 | 12/2015 | Tuch et al. |
| 2015/0371244 A1 | 12/2015 | Neuse et al. |

(56) References Cited

U.S. PATENT DOCUMENTS

| | | |
|---|---|---|
| 2015/0378762 A1 | 12/2015 | Saladi et al. |
| 2015/0378764 A1 | 12/2015 | Sivasubramanian et al. |
| 2015/0378765 A1 | 12/2015 | Singh et al. |
| 2015/0379167 A1 | 12/2015 | Griffith et al. |
| 2016/0011901 A1 | 1/2016 | Hurwitz et al. |
| 2016/0012099 A1 | 1/2016 | Tuatini et al. |
| 2016/0019081 A1 | 1/2016 | Chandrasekaran et al. |
| 2016/0019082 A1 | 1/2016 | Chandrasekaran et al. |
| 2016/0019536 A1 | 1/2016 | Ortiz et al. |
| 2016/0021112 A1 | 1/2016 | Katieb |
| 2016/0026486 A1 | 1/2016 | Abdallah |
| 2016/0048606 A1 | 2/2016 | Rubinstein et al. |
| 2016/0070714 A1 | 3/2016 | D'Sa et al. |
| 2016/0072727 A1 | 3/2016 | Leafe et al. |
| 2016/0072781 A1 | 3/2016 | Zhang et al. |
| 2016/0077901 A1 | 3/2016 | Roth et al. |
| 2016/0092320 A1 | 3/2016 | Baca |
| 2016/0092493 A1 | 3/2016 | Ko et al. |
| 2016/0098285 A1 | 4/2016 | Davis et al. |
| 2016/0100036 A1 | 4/2016 | Lo et al. |
| 2016/0103739 A1 | 4/2016 | Huang et al. |
| 2016/0110188 A1 | 4/2016 | Verde et al. |
| 2016/0117163 A1 | 4/2016 | Fukui et al. |
| 2016/0117254 A1 | 4/2016 | Susarla et al. |
| 2016/0119289 A1 | 4/2016 | Jain et al. |
| 2016/0124665 A1 | 5/2016 | Jain et al. |
| 2016/0124978 A1 | 5/2016 | Nithrakashyap et al. |
| 2016/0140180 A1 | 5/2016 | Park et al. |
| 2016/0150053 A1 | 5/2016 | Janczuk et al. |
| 2016/0188367 A1* | 6/2016 | Zeng ............... H04L 47/70 |
| | | 718/104 |
| 2016/0191420 A1 | 6/2016 | Nagarajan et al. |
| 2016/0198235 A1 | 7/2016 | Liu et al. |
| 2016/0203219 A1 | 7/2016 | Hoch et al. |
| 2016/0212007 A1 | 7/2016 | Alatorre et al. |
| 2016/0226955 A1* | 8/2016 | Moorthi ............. G06F 9/5066 |
| 2016/0282930 A1 | 9/2016 | Ramachandran et al. |
| 2016/0285906 A1 | 9/2016 | Fine et al. |
| 2016/0292016 A1 | 10/2016 | Bussard et al. |
| 2016/0294614 A1 | 10/2016 | Searle et al. |
| 2016/0306613 A1 | 10/2016 | Busi et al. |
| 2016/0315910 A1 | 10/2016 | Kaufman |
| 2016/0350099 A1 | 12/2016 | Suparna et al. |
| 2016/0350124 A1 | 12/2016 | Gschwind et al. |
| 2016/0357536 A1 | 12/2016 | Firlik et al. |
| 2016/0364265 A1 | 12/2016 | Cao et al. |
| 2016/0364316 A1 | 12/2016 | Bhat et al. |
| 2016/0371127 A1 | 12/2016 | Antony et al. |
| 2016/0371156 A1 | 12/2016 | Merriman |
| 2016/0378449 A1 | 12/2016 | Khazanchi et al. |
| 2016/0378525 A1 | 12/2016 | Bjorkengren |
| 2016/0378547 A1 | 12/2016 | Brouwer et al. |
| 2016/0378554 A1 | 12/2016 | Gummaraju et al. |
| 2017/0004169 A1 | 1/2017 | Merrill et al. |
| 2017/0032000 A1 | 2/2017 | Sharma et al. |
| 2017/0041144 A1 | 2/2017 | Krapf et al. |
| 2017/0041309 A1 | 2/2017 | Ekambaram et al. |
| 2017/0060610 A1 | 3/2017 | Klee et al. |
| 2017/0060615 A1 | 3/2017 | Thakkar et al. |
| 2017/0060621 A1 | 3/2017 | Whipple et al. |
| 2017/0063615 A1* | 3/2017 | Yang ............... H04L 67/62 |
| 2017/0068574 A1 | 3/2017 | Cherkasova et al. |
| 2017/0075749 A1 | 3/2017 | Ambichl et al. |
| 2017/0083381 A1 | 3/2017 | Cong et al. |
| 2017/0085447 A1 | 3/2017 | Chen et al. |
| 2017/0085502 A1 | 3/2017 | Biruduraju |
| 2017/0085591 A1 | 3/2017 | Ganda et al. |
| 2017/0091235 A1 | 3/2017 | Yammine et al. |
| 2017/0091296 A1 | 3/2017 | Beard et al. |
| 2017/0093684 A1 | 3/2017 | Jayaraman et al. |
| 2017/0093920 A1 | 3/2017 | Ducatel et al. |
| 2017/0118247 A1 | 4/2017 | Hussain et al. |
| 2017/0134519 A1 | 5/2017 | Chen et al. |
| 2017/0142099 A1 | 5/2017 | Hinohara et al. |
| 2017/0147656 A1 | 5/2017 | Choudhary et al. |
| 2017/0149740 A1 | 5/2017 | Mansour et al. |
| 2017/0153965 A1 | 6/2017 | Nitta et al. |
| 2017/0161059 A1* | 6/2017 | Wood ............... G06F 9/45558 |
| 2017/0177266 A1 | 6/2017 | Doerner et al. |
| 2017/0177441 A1 | 6/2017 | Chow |
| 2017/0177854 A1 | 6/2017 | Gligor et al. |
| 2017/0188213 A1 | 6/2017 | Nirantar et al. |
| 2017/0192825 A1* | 7/2017 | Biberman ............ H04W 28/095 |
| 2017/0221000 A1 | 8/2017 | Anand |
| 2017/0230262 A1 | 8/2017 | Sreeramoju et al. |
| 2017/0230499 A1 | 8/2017 | Mumick et al. |
| 2017/0249130 A1 | 8/2017 | Smiljamic et al. |
| 2017/0264681 A1 | 9/2017 | Apte et al. |
| 2017/0272462 A1 | 9/2017 | Kraemer et al. |
| 2017/0286143 A1 | 10/2017 | Wagner et al. |
| 2017/0286187 A1 | 10/2017 | Chen et al. |
| 2017/0288878 A1 | 10/2017 | Lee et al. |
| 2017/0300359 A1* | 10/2017 | Kollur ............... G06F 9/4881 |
| 2017/0308520 A1 | 10/2017 | Beahan, Jr. et al. |
| 2017/0315163 A1 | 11/2017 | Wang et al. |
| 2017/0318083 A1* | 11/2017 | Ignatyev ............. H04L 43/0876 |
| 2017/0322824 A1 | 11/2017 | Reuther et al. |
| 2017/0329578 A1 | 11/2017 | Iscen |
| 2017/0346808 A1 | 11/2017 | Anzai et al. |
| 2017/0353851 A1 | 12/2017 | Gonzalez et al. |
| 2017/0364345 A1* | 12/2017 | Fontoura ............. G06F 9/52 |
| 2017/0371720 A1 | 12/2017 | Basu et al. |
| 2017/0371724 A1 | 12/2017 | Wagner et al. |
| 2017/0372142 A1 | 12/2017 | Bilobrov |
| 2018/0004555 A1 | 1/2018 | Ramanathan et al. |
| 2018/0004556 A1 | 1/2018 | Marriner et al. |
| 2018/0004575 A1 | 1/2018 | Marriner et al. |
| 2018/0032410 A1 | 2/2018 | Kang et al. |
| 2018/0046453 A1 | 2/2018 | Nair et al. |
| 2018/0046482 A1 | 2/2018 | Karve et al. |
| 2018/0060132 A1 | 3/2018 | Maru et al. |
| 2018/0060221 A1 | 3/2018 | Yim et al. |
| 2018/0060318 A1 | 3/2018 | Yang et al. |
| 2018/0067841 A1 | 3/2018 | Mahimkar |
| 2018/0067873 A1 | 3/2018 | Pikhur et al. |
| 2018/0069702 A1 | 3/2018 | Ayyadevara et al. |
| 2018/0081717 A1 | 3/2018 | Li |
| 2018/0089232 A1 | 3/2018 | Spektor et al. |
| 2018/0095738 A1 | 4/2018 | Dürkop et al. |
| 2018/0113770 A1 | 4/2018 | Hasanov et al. |
| 2018/0113793 A1 | 4/2018 | Fink et al. |
| 2018/0121245 A1 | 5/2018 | Wagner et al. |
| 2018/0121665 A1 | 5/2018 | Anderson et al. |
| 2018/0129684 A1 | 5/2018 | Wilson et al. |
| 2018/0143865 A1 | 5/2018 | Wagner et al. |
| 2018/0144263 A1 | 5/2018 | Saxena et al. |
| 2018/0150339 A1 | 5/2018 | Pan et al. |
| 2018/0152401 A1 | 5/2018 | Tandon et al. |
| 2018/0152405 A1 | 5/2018 | Kuo et al. |
| 2018/0152406 A1 | 5/2018 | Kuo et al. |
| 2018/0165110 A1 | 6/2018 | Htay |
| 2018/0192101 A1 | 7/2018 | Bilobrov |
| 2018/0225096 A1 | 8/2018 | Mishra et al. |
| 2018/0227300 A1 | 8/2018 | Nakic et al. |
| 2018/0239636 A1 | 8/2018 | Arora et al. |
| 2018/0253333 A1 | 9/2018 | Gupta |
| 2018/0255137 A1 | 9/2018 | Hu et al. |
| 2018/0268130 A1 | 9/2018 | Ghosh et al. |
| 2018/0275987 A1 | 9/2018 | Vandeputte |
| 2018/0285101 A1 | 10/2018 | Yahav et al. |
| 2018/0300111 A1 | 10/2018 | Bhat et al. |
| 2018/0314845 A1 | 11/2018 | Anderson et al. |
| 2018/0316552 A1* | 11/2018 | Subramani Nadar ....................... |
| | | H04L 41/5045 |
| 2018/0341504 A1 | 11/2018 | Kissell |
| 2018/0365422 A1 | 12/2018 | Callaghan et al. |
| 2018/0367517 A1 | 12/2018 | Tus |
| 2018/0375781 A1 | 12/2018 | Chen et al. |
| 2019/0004866 A1 | 1/2019 | Du et al. |
| 2019/0018715 A1 | 1/2019 | Behrendt et al. |
| 2019/0028552 A1* | 1/2019 | Johnson, II .......... H04L 67/02 |
| 2019/0034095 A1 | 1/2019 | Singh et al. |
| 2019/0043231 A1 | 2/2019 | Uzgin et al. |
| 2019/0050258 A1* | 2/2019 | Kim ............... G06F 9/5011 |

(56) References Cited

U.S. PATENT DOCUMENTS

| | | |
|---|---|---|
| 2019/0068622 A1 | 2/2019 | Lin et al. |
| 2019/0072529 A1 | 3/2019 | Andrawes et al. |
| 2019/0073430 A1 | 3/2019 | Webster |
| 2019/0079751 A1 | 3/2019 | Foskett et al. |
| 2019/0102231 A1 | 4/2019 | Wagner |
| 2019/0102278 A1 | 4/2019 | Gahlin et al. |
| 2019/0108058 A1 | 4/2019 | Wagner et al. |
| 2019/0140831 A1 | 5/2019 | De Lima Junior et al. |
| 2019/0141015 A1 | 5/2019 | Nellen |
| 2019/0147085 A1 | 5/2019 | Pal et al. |
| 2019/0147515 A1 | 5/2019 | Hurley et al. |
| 2019/0149480 A1* | 5/2019 | Singhvi ............... H04L 47/2483 709/226 |
| 2019/0155629 A1 | 5/2019 | Wagner et al. |
| 2019/0171423 A1 | 6/2019 | Mishra et al. |
| 2019/0171470 A1 | 6/2019 | Wagner |
| 2019/0179678 A1* | 6/2019 | Banerjee ............... G06F 9/5083 |
| 2019/0179725 A1 | 6/2019 | Mital et al. |
| 2019/0180036 A1 | 6/2019 | Shukla |
| 2019/0188288 A1 | 6/2019 | Holm et al. |
| 2019/0196884 A1 | 6/2019 | Wagner |
| 2019/0227849 A1 | 7/2019 | Wisniewski et al. |
| 2019/0235848 A1 | 8/2019 | Swiecki et al. |
| 2019/0238590 A1 | 8/2019 | Talukdar et al. |
| 2019/0250937 A1 | 8/2019 | Thomas et al. |
| 2019/0268152 A1 | 8/2019 | Sandoval et al. |
| 2019/0278938 A1* | 9/2019 | Greene ................ H04L 41/40 |
| 2019/0286475 A1 | 9/2019 | Mani |
| 2019/0286492 A1* | 9/2019 | Gulsvig Wood .......... G06F 9/50 |
| 2019/0303117 A1 | 10/2019 | Kocberber et al. |
| 2019/0306692 A1 | 10/2019 | Garty et al. |
| 2019/0311115 A1 | 10/2019 | Lavi et al. |
| 2019/0318312 A1 | 10/2019 | Foskett et al. |
| 2019/0320038 A1 | 10/2019 | Walsh et al. |
| 2019/0324813 A1* | 10/2019 | Bogineni ............... G06F 9/4843 |
| 2019/0339955 A1 | 11/2019 | Kuo et al. |
| 2019/0340033 A1* | 11/2019 | Ganteaume ............. H04L 43/16 |
| 2019/0361802 A1 | 11/2019 | Li et al. |
| 2019/0363885 A1 | 11/2019 | Schiavoni et al. |
| 2019/0370113 A1 | 12/2019 | Zhang et al. |
| 2019/0384647 A1 | 12/2019 | Reque et al. |
| 2019/0391834 A1 | 12/2019 | Mullen et al. |
| 2019/0391841 A1 | 12/2019 | Mullen et al. |
| 2020/0007456 A1 | 1/2020 | Greenstein et al. |
| 2020/0026527 A1 | 1/2020 | Xu et al. |
| 2020/0028936 A1 | 1/2020 | Gupta et al. |
| 2020/0034471 A1 | 1/2020 | Danilov et al. |
| 2020/0057680 A1 | 2/2020 | Marriner et al. |
| 2020/0065079 A1 | 2/2020 | Kocberber et al. |
| 2020/0073770 A1* | 3/2020 | Mortimore, Jr. ..... G06F 11/2035 |
| 2020/0073987 A1 | 3/2020 | Perumala et al. |
| 2020/0081745 A1 | 3/2020 | Cybulski et al. |
| 2020/0104198 A1 | 4/2020 | Hussels et al. |
| 2020/0104378 A1 | 4/2020 | Wagner et al. |
| 2020/0110691 A1 | 4/2020 | Bryant et al. |
| 2020/0120120 A1 | 4/2020 | Cybulski |
| 2020/0134030 A1 | 4/2020 | Natanzon et al. |
| 2020/0136933 A1* | 4/2020 | Raskar ................ H04L 41/5054 |
| 2020/0142724 A1 | 5/2020 | Wagner et al. |
| 2020/0153798 A1 | 5/2020 | Liebherr |
| 2020/0153897 A1* | 5/2020 | Mestery ............... H04L 47/125 |
| 2020/0167208 A1 | 5/2020 | Floes et al. |
| 2020/0186445 A1 | 6/2020 | Govindaraju et al. |
| 2020/0192646 A1* | 6/2020 | Yerramreddy ....... G06Q 10/067 |
| 2020/0192707 A1 | 6/2020 | Brooker et al. |
| 2020/0213151 A1 | 7/2020 | Srivatsan et al. |
| 2020/0241930 A1 | 7/2020 | Garg et al. |
| 2020/0327236 A1 | 10/2020 | Pratt et al. |
| 2020/0341741 A1 | 10/2020 | Brooker et al. |
| 2020/0341799 A1 | 10/2020 | Wagner et al. |
| 2020/0348979 A1 | 11/2020 | Calmon |
| 2020/0349067 A1 | 11/2020 | Syamala et al. |
| 2020/0366587 A1 | 11/2020 | White et al. |
| 2020/0401455 A1 | 12/2020 | Church et al. |
| 2020/0412538 A1 | 12/2020 | Rosado |
| 2020/0412707 A1 | 12/2020 | Siefker et al. |
| 2020/0412720 A1 | 12/2020 | Siefker et al. |
| 2020/0412825 A1 | 12/2020 | Siefker et al. |
| 2021/0019056 A1 | 1/2021 | Mangione-Tran |
| 2021/0042160 A1 | 2/2021 | Alamouti et al. |
| 2021/0081233 A1 | 3/2021 | Mullen et al. |
| 2021/0117217 A1 | 4/2021 | Croteau et al. |
| 2021/0117534 A1 | 4/2021 | Maximov et al. |
| 2021/0124822 A1 | 4/2021 | Tiwary et al. |
| 2021/0157645 A1 | 5/2021 | Yanacek et al. |
| 2021/0176333 A1 | 6/2021 | Coleman et al. |
| 2021/0232415 A1 | 7/2021 | Wagner et al. |
| 2021/0233045 A1 | 7/2021 | Singh et al. |
| 2021/0294646 A1 | 9/2021 | Hassaan et al. |
| 2021/0303720 A1 | 9/2021 | Creenaune et al. |
| 2021/0314250 A1 | 10/2021 | Laplante et al. |
| 2021/0342145 A1 | 11/2021 | Miller et al. |
| 2021/0342329 A1 | 11/2021 | Padmanabhan |
| 2022/0200993 A1 | 6/2022 | Smith |
| 2022/0201041 A1 | 6/2022 | Keiser, Jr. et al. |
| 2022/0214863 A1 | 7/2022 | Clement et al. |
| 2022/0391238 A1 | 12/2022 | Wagner |
| 2023/0024699 A1 | 1/2023 | Bayoumi et al. |
| 2024/0220305 A1 | 7/2024 | Mullet et al. |

FOREIGN PATENT DOCUMENTS

| | | |
|---|---|---|
| CA | 2 962 631 C | 10/2023 |
| CN | 1341238 A | 3/2002 |
| CN | 101002170 A | 7/2007 |
| CN | 101267334 A | 9/2008 |
| CN | 101345757 A | 1/2009 |
| CN | 101496005 A | 7/2009 |
| CN | 101627388 A | 1/2010 |
| CN | 101640700 A | 2/2010 |
| CN | 101764824 A | 6/2010 |
| CN | 102171712 A | 8/2011 |
| CN | 102246152 A | 11/2011 |
| CN | 102365858 A | 2/2012 |
| CN | 102420846 A | 4/2012 |
| CN | 102761549 A | 10/2012 |
| CN | 103098027 A | 5/2013 |
| CN | 103140828 A | 6/2013 |
| CN | 103384237 A | 11/2013 |
| CN | 103731427 A | 4/2014 |
| CN | 104111848 A | 10/2014 |
| CN | 104160378 A | 11/2014 |
| CN | 104243479 A | 12/2014 |
| CN | 104903854 A | 9/2015 |
| CN | 105122243 A | 12/2015 |
| CN | 105956000 A | 9/2016 |
| CN | 106921651 A | 7/2017 |
| CN | 107533472 A | 1/2018 |
| CN | 107534672 A | 1/2018 |
| CN | 108885568 A | 11/2018 |
| CN | 109478134 A | 3/2019 |
| CN | 109564525 A | 4/2019 |
| CN | 112513813 A | 3/2021 |
| EP | 2663052 A1 | 11/2013 |
| EP | 3201762 A1 | 8/2017 |
| EP | 3254434 A1 | 12/2017 |
| EP | 3356938 A1 | 8/2018 |
| EP | 3201768 B1 | 12/2019 |
| EP | 3811209 A1 | 4/2021 |
| EP | 3814895 A1 | 5/2021 |
| EP | 3857375 A1 | 8/2021 |
| EP | 4064052 A1 | 9/2022 |
| JP | 2002287974 A | 10/2002 |
| JP | 2006-107599 A | 4/2006 |
| JP | 2007-080161 A | 3/2007 |
| JP | 2007-538323 A | 12/2007 |
| JP | 2010-026562 A | 2/2010 |
| JP | 2011-065243 A | 3/2011 |
| JP | 2011-233146 A | 11/2011 |
| JP | 2011257847 A | 12/2011 |
| JP | 2012-078893 A | 4/2012 |
| JP | 2012-104150 A | 5/2012 |
| JP | 2013-156996 A | 8/2013 |
| JP | 2014-525624 A | 9/2014 |

(56) References Cited

FOREIGN PATENT DOCUMENTS

| | | |
|---|---|---|
| JP | 2016-507100 A | 3/2016 |
| JP | 2017-534107 A | 11/2017 |
| JP | 2017-534967 A | 11/2017 |
| JP | 2018-503896 A | 2/2018 |
| JP | 2018-512087 A | 5/2018 |
| JP | 2018-536213 A | 12/2018 |
| JP | 7197612 B2 | 12/2022 |
| KR | 10-357850 B1 | 10/2002 |
| KR | 10-2021-0019533 A | 2/2021 |
| WO | WO 2008/114454 A1 | 9/2008 |
| WO | WO 2009/137567 A1 | 11/2009 |
| WO | WO 2012/039834 A1 | 3/2012 |
| WO | WO 2012/050772 A1 | 4/2012 |
| WO | WO 2013/106257 A1 | 7/2013 |
| WO | WO 2015/078394 A1 | 6/2015 |
| WO | WO 2015/108539 A1 | 7/2015 |
| WO | WO 2015/149017 A1 | 10/2015 |
| WO | WO 2016/053950 A1 | 4/2016 |
| WO | WO 2016/053968 A1 | 4/2016 |
| WO | WO 2016/053973 A1 | 4/2016 |
| WO | WO 2016/090292 A1 | 6/2016 |
| WO | WO 2016/126731 A1 | 8/2016 |
| WO | WO 2016/164633 A1 | 10/2016 |
| WO | WO 2016/164638 A1 | 10/2016 |
| WO | WO 2017/059248 A1 | 4/2017 |
| WO | WO 2017/112526 A1 | 6/2017 |
| WO | WO 2017/172440 A1 | 10/2017 |
| WO | WO 2018/005500 A1 | 1/2018 |
| WO | WO 2018/005829 A1 | 1/2018 |
| WO | WO 2018/098443 A1 | 5/2018 |
| WO | WO 2018/098445 A1 | 5/2018 |
| WO | WO 2020/005764 A1 | 1/2020 |
| WO | WO 2020/006081 A1 | 1/2020 |
| WO | WO 2020/069104 A1 | 4/2020 |
| WO | WO 2020/123439 A1 | 6/2020 |
| WO | WO 2020/264431 A1 | 12/2020 |
| WO | WO 2021/108435 | 6/2021 |
| WO | WO 2023/107649 A1 | 6/2023 |

OTHER PUBLICATIONS

Sarah Neenan, Compare Serverless tools and services in the Public cloud, https://www.techtarget.com/searchcloudcomputing/feature/Compare-serverless-tools-and-services-in-the-public-cloud, TechTarget, pp. 1-4 (Year: 2023).*
Wikipedia: Serverless computing, https://en.wikipedia.org/wiki/Serverless_computing, pp. 1-7 (Year: 2023).*
Anonymous: "Docker run reference", Dec. 7, 2015, XP055350246, Retrieved from the Internet: URL:web.archive.org/web/20151207111702/docs.docker.com/engine/reference/run/ [retrieved on Feb. 28, 2017].
Adapter Pattern, Wikipedia, en.wikipedia.org/w/index.php?title=Adapter_pattern&oldid=654971255, [retrieved May 26, 2016], 6 pages.
Amazon, "AWS Lambda: Developer Guide", Retrieved from the Internet, Jun. 26, 2016, URL : docs.aws.amazon.com/lambda/ latest/dg/lambda-dg.pdf, 346 pages.
Amazon, "AWS Lambda: Developer Guide", Retrieved from the Internet, 2019, URL : docs.aws.amazon.com/lambda/ latest/dg/lambda-dg.pdf, 521 pages.
Balazinska et al., Moirae: History-Enhanced Monitoring, Published: 2007, 12 pages.
Ben-Yehuda et al., "Deconstructing Amazon EC2 Spot Instance Pricing", ACM Transactions on Economics and Computation 1.3, 2013, 15 pages.
Bhadani et al., Performance evaluation of web servers using central load balancing policy over virtual machines on cloud, Jan. 2010, 4 pages.
CodeChef Admin discussion web page, retrieved from discuss.codechef.com/t/what-are-the-memory-limit-and-stack-size-on-codechef/14159, 2019.
CodeChef IDE web page, Code, Compile & Run, retrieved from codechef.com/ide, 2019.
Czajkowski, G., and L. Daynes, Multitasking Without Compromise: A Virtual Machine Evolution 47(4a):60-73, ACM SIGPLAN Notices—Supplemental Issue, Apr. 2012.
Das et al., Adaptive Stream Processing using Dynamic Batch Sizing, 2014, 13 pages.
Deis, Container, 2014, 1 page.
Dombrowski, M., et al., Dynamic Monitor Allocation in the Java Virtual Machine, JTRES '13, Oct. 9-11, 2013, pp. 30-37.
Dynamic HTML, Wikipedia page from date Mar. 27, 2015, retrieved using the WayBackMachine, from web.archive.org/web/20150327215418/https://en.wikipedia.org/wiki/Dynamic_HTML, 2015, 6 pages.
Espadas, J., et al., A Tenant-Based Resource Allocation Model for Scaling Software-as-a-Service Applications Over Cloud Computing Infrastructures, Future Generation Computer Systems, vol. 29, pp. 273-286, 2013.
Han et al., Lightweight Resource Scaling for Cloud Applications, 2012, 8 pages.
Hoffman, Auto scaling your website with Amazon Web Services (AWS)—Part 2, Cardinalpath, Sept, 2015, 15 pages.
discuss.codechef.com discussion web page from date Nov. 11, 2012, retrieved using the WayBackMachine, from web.archive.org/web/20121111040051 discuss.codechef.com/questions/2881 /why-are-simple-java-programs-using-up-so-much-space, 2012.
codechef.com code error help page from Jan. 2014, retrieved from codechef.com/JAN14/status/ERROR,va123, 2014.
codechef.com/ide web page from date Apr. 5, 2015, retrieved using the WayBackMachine, from web.archive.org/web/20150405045518/codechef.com/ide, 2015.
Kamga et al., Extended scheduler for efficient frequency scaling in virtualized systems, Jul. 2012, 8 pages.
Kato, et al. "Web Service Conversion Architecture of the Web Application and Evaluation"; Research Report from Information Processing Society, Apr. 3, 2006 with Machine Translation.
Kazempour et al., AASH: an asymmetry-aware scheduler for hypervisors, Jul. 2010, 12 pages.
Kraft et al., 10 performance prediction in consolidated virtualized environments, Mar. 2011, 12 pages.
Krsul et al., "VMPlants: Providing and Managing Virtual Machine Execution Environments for Grid Computing", Supercomputing, 2004. Proceedings of the ACM/IEEESC 2004 Conference Pittsburgh, PA, XP010780332, Nov. 6-12, 2004, 12 pages.
Meng et al., Efficient resource provisioning in compute clouds via VM multiplexing, Jun. 2010, 10 pages.
Merkel, "Docker: Lightweight Linux Containers for Consistent Development and Deployment", Linux Journal, vol. 2014 Issue 239, Mar. 2014, XP055171140, 16 pages.
Monteil, Coupling profile and historical methods to predict execution time of parallel applications. Parallel and Cloud Computing, 2013, <hal-01228236, pp. 81-89.
Nakajima, J., et al., Optimizing Virtual Machines Using Hybrid Virtualization, SAC '11, Mar. 21-25, 2011, TaiChung, Taiwan, pp. 573-578.
Qian, H., and D. Medhi, et al., Estimating Optimal Cost of Allocating Virtualized Resources With Dynamic Demand, ITC 2011, Sep. 2011, pp. 320-321.
Sakamoto, et al. "Platform for Web Services using Proxy Server"; Research Report from Information Processing Society, Mar. 22, 2002, vol. 2002, No. 31.
Shim (computing), Wikipedia, en.wikipedia.org/w/index.php?title+Shim_(computing)&oldid+654971528, [retrieved on May 26, 2016], 2 pages.
Stack Overflow, Creating a database connection pool, 2009, 4 pages.
Tan et al., Provisioning for large scale cloud computing services, Jun. 2012, 2 pages.
Tange, "GNU Parallel: The Command-Line Power Tool", vol. 36, No. 1, Jan. 1, 1942, pp. 42-47.
Vaghani, S.B., Virtual Machine File System, ACM SIGOPS Operating Systems Review 44(4):57-70, Dec. 2010.

(56) References Cited

OTHER PUBLICATIONS

Vaquero, L., et al., Dynamically Scaling Applications in the cloud, ACM SIGCOMM Computer Communication Review 41(1):45-52, Jan. 2011.
Wang et al., "Improving utilization through dynamic VM resource allocation in hybrid cloud environment", Parallel and Distributed V Systems (ICPADS), IEEE, 2014. Retrieved on Feb. 14, 2019, Retrieved from the internet: URLieeexplore.ieee.org/stamp/stamp.jsp?tp=&arnumber=7097814, 8 pages.
Wikipedia "API" pages from date Apr. 7, 2015, retrieved using the WayBackMachine from web.archive.org/web/20150407191158/en.wikipedia.org/wiki/Application_programming_interface.
Wikipedia List_of_HTTP status_codes web page, retrieved from en.wikipedia.org/wiki/List_of_HTTP status_codes, 2019.
Wikipedia Recursion web page from date Mar. 26, 2015, retrieved using the WayBackMachine, from web.archive.org/web/20150326230100en .wikipedia.org/wiki/Recursion_(computer_science), 2015.
Wikipedia subroutine web page, retrieved from en.wikipedia.org/wiki/Subroutine, 2019.
Wu et al., HC-Midware: A Middleware to Enable High Performance Communication System Simulation in Heterogeneous Cloud, Association for Computing Machinery, Oct. 20-22, 2017, 10 pages.
Yamasaki et al. "Model-based resource selection for efficient virtual cluster deployment", Virtualization Technology in Distributed Computing, ACM, Nov. 2007, pp. 1-7.
Yue et al., AC 2012-4107: Using Amazon EC2 in Computer and Network Security Lab Exercises: Design, Results, and Analysis, 2012, American Society for Engineering Education 2012.
Zheng, C., and D. Thain, Integrating Containers into Workflows: A Case Study Using Makeflow, Work Queue, and Docker, VTDC '15, Jun. 15, 2015, Portland, Oregon, pp. 31-38.
International Search Report and Written Opinion in PCT/US2015/052810 dated Dec. 17, 2015.
International Preliminary Report on Patentability in PCT/US2015/052810 dated Apr. 4, 2017.
Extended Search Report in European Application No. 15846932.0 dated May 3, 2018.
International Search Report and Written Opinion in PCT/US2015/052838 dated Dec. 18, 2015.
International Preliminary Report on Patentability in PCT/US2015/052838 dated Apr. 4, 2017.
Extended Search Report in European Application No. 15847202.7 dated Sep. 9, 2018.
Extended Search Report in European Application No. 19199402.9 dated Mar. 6, 2020.
International Search Report and Written Opinion in PCT/US2015/052833 dated Jan. 13, 2016.
International Preliminary Report on Patentability in PCT/US2015/052833 dated Apr. 4, 2017.
Extended Search Report in European Application No. 15846542.7 dated Aug. 27, 2018.
International Search Report and Written Opinion in PCT/US2015/064071dated Mar. 16, 2016.
International Preliminary Report on Patentability in PCT/US2015/064071 dated Jun. 6, 2017.
International Search Report and Written Opinion in PCT/US2016/016211 dated Apr. 13, 2016.
International Preliminary Report on Patentability in PCT/US2016/016211 dated Aug. 17, 2017.
International Search Report and Written Opinion in PCT/US2016/026514 dated Jun. 8, 2016.
International Preliminary Report on Patentability in PCT/US2016/026514 dated Oct. 10, 2017.
International Search Report and Written Opinion in PCT/US2016/026520 dated Jul. 5, 2016.
International Preliminary Report on Patentability in PCT/US2016/026520 dated Oct. 10, 2017.
International Search Report and Written Opinion in PCT/US2016/054774 dated Dec. 16, 2016.
International Preliminary Report on Patentability in PCT/US2016/054774 dated Apr. 3, 2018.
International Search Report and Written Opinion in PCT/US2016/066997 dated Mar. 20, 2017.
International Preliminary Report on Patentability in PCT/US2016/066997 dated Jun. 26, 2018.
International Search Report and Written Opinion in PCT/US/2017/023564 dated Jun. 6, 2017.
International Preliminary Report on Patentability in PCT/US/2017/023564 dated Oct. 2, 2018.
International Search Report and Written Opinion in PCT/US2017/040054 dated Sep. 21, 2017.
International Preliminary Report on Patentability in PCT/US2017/040054 dated Jan. 1, 2019.
International Search Report and Written Opinion in PCT/US2017/039514 dated Oct. 10, 2017.
International Preliminary Report on Patentability in PCT/US2017/039514 dated Jan. 1, 2019.
Extended European Search Report in application No. 17776325.7 dated Oct. 23, 2019.
Office Action in European Application No. 17743108.7 dated Jan. 14, 2020.
Bebenita et al., "Trace-Based Compilation in Execution Environments without Interpreters," ACM, Copyright 2010, 10 pages.
Ha et al., A Concurrent Trace-based Just-In-Time Compiler for Single-threaded JavaScript, utexas.edu (Year: 2009).
Huang, Zhe, Danny HK Tsang, and James She. "A virtual machine consolidation framework for mapreduce enabled computing clouds." 2012 24th International Teletraffic Congress (ITC 24). IEEE, 2012. (Year: 2012).
Lagar-Cavilla, H. Andres, et al. "Snowflock: Virtual machine cloning as a first-class cloud primitive." ACM Transactions on Computer Systems (TOCS) 29.1 (2011): 1-45. (Year: 2011).
Wood, Timothy, et al. "Cloud Net: dynamic pooling of cloud resources by live WAN migration of virtual machines." ACM Sigplan Notices 46.7 (2011): 121-132. (Year: 2011).
Zhang et al., VMThunder: Fast Provisioning of Large-Scale Virtual Machine Clusters, IEEE Transactions on Parallel and Distributed Systems, vol. 25, No. 12, Dec. 2014, pp. 3328-3338.
International Search Report and Written Opinion mailed Oct. 15, 2019 for International Application No. PCT/US2019/039246 in 16 pages.
International Search Report for Application No. PCT/US2019/038520 dated Aug. 14, 2019.
International Search Report for Application No. PCT/US2020/039996 dated Oct. 8, 2020.
Bryan Liston, "Ad Hoc Big Data Processing Made Simple with Serverless Map Reduce", Nov. 4, 2016, Amazon Web Services laws.amazon .com/bl ogs/compute/ad-hoc-big-data-processi ng-made-si mple-with-serverless- mapred uce >.
Dean et al., "MapReduce: Simplified Data Processing on Large Clusters", ACM, 2008, pp. 107-113.
Ekanayake et al., "Twister: A Runtime for Iterative MapReduce", ACM, 2010, pp. 810-818.
Fan et al., Online Optimization of VM Deployment in IaaS Cloud, 2012, 6 pages.
Hammoud et al., "Locality-Aware Reduce Task Scheduling for MapReduce", IEEE, 2011, pp. 570-576.
Kim et al., "MRBench: A Benchmark for Map-Reduce Framework", IEEE, 2008, pp. 11-18.
Lin, "MR-Apriori: Association Rules Algorithm Based on MapReduce", IEEE, 2014, pp. 141-144.
Search Query Report from IP.com, performed Dec. 2, 2020.
Search Query Report from IP.com, performed May 27, 2021.
Yang, The Application of MapReduce in the Cloud Computing:, IEEE, 2011, pp. 154-156.
Office Action in Canadian Application No. 2,962,633 dated May 21, 2020.
Office Action in Canadian Application No. 2,962,633 dated Jun. 18, 2021.
Office Action in European Application No. 19199402.9 dated Mar. 23, 2021.

(56) References Cited

OTHER PUBLICATIONS

Office Action in Japanese Application No. 2017-516160 dated Jan. 15, 2018.
Notice of Allowance in Japanese Application No. 2017-516160 dated May 8, 2018.
Office Action in Canadian Application No. 2,962,631 dated May 19, 2020.
Office Action in Canadian Application No. 2,962,631 dated May 31, 2021.
Office Action in Indian Application No. 201717013356 dated Jan. 22, 2021.
Office Action in Japanese Application No. 2017-516168 dated Mar. 26, 2018.
Office Action in Indian Application No. 201717019903 dated May 18, 2020.
Office Action in Australian Application No. 2016215438 dated Feb. 26, 2018.
Notice of Allowance in Australian Application No. 2016215438 dated Nov. 19, 2018.
Office Action in Canadian Application No. 2,975,522 dated Jun. 5, 2018.
Notice of Allowance in Canadian Application No. 2,975,522 dated Mar. 13, 2020.
Office Action in Indian Application No. 201717027369 dated May 21, 2020.
Office Action in Chinese Application No. 2016800207682 dated May 14, 2021.
First Examination Report for Indian Application No. 201717034806 dated Jun. 25, 2020.
Office Action in Chinese Application No. 2016800562398 dated Jun. 18, 2021.
Office Action in European Application No. 16781265.0 dated Jul. 13, 2020.
Office Action in European Application No. 201817013748 dated Nov. 20, 2020.
Office Action in Chinese Application No. 201680072794X dated Jun. 22, 2021.
Office Action in European Application No. 16823419.3 dated Mar. 12, 2021.
Office Action in Chinese Application No. 201780022789.2 dated Apr. 28, 2021.
Office Action in European Application No. 17776325.7 dated Apr. 12, 2021.
Office Action in Chinese Application No. 2017800451968 dated May 26, 2021.
Office Action in European Application No. 17740533.9 dated May 4, 2021.
Office Action in European Application No. 17743108.7 dated Dec. 22, 2020.
International Preliminary Report on Patentability mailed Dec. 29, 2020 for International Application No. PCT/US2019/039246 in 8 pages.
International Preliminary Report on Patentability for Application No. PCT/US2019/038520 dated Dec. 29, 2020.
International Preliminary Report on Patentability and Written Opinion in PCT/US2019/053123 dated Mar. 23, 2021.
International Search Report and Written Opinion in PCT/US2019/053123 dated Jan. 7, 2020.
International Search Report for Application No. PCT/US2019/065365 dated Mar. 19, 2020.
International Search Report for Application No. PCT/US2019/065365 dated Jun. 8, 2021.
International Search Report for Application No. PCT/US2020/062060 dated Mar. 5, 2021.
Amazon, "AWS Lambda: Developer Guide", Jun. 26, 2016 Retrieved from the Internet, URL:docs.aws.amazon.com/lambda/latest/dg/lambda-dg.pdf, [retrieved on Aug. 30, 2017], 314 pages.

Dornemann et al., "On-Demand Resource Provisioning for BPEL Workflows Using Amazon's Elastic Compute Cloud", 9th IEEE/ACM International Symposium on Cluster Computing and the Grid, 2009, pp. 140-147.
Ryden et al., "Nebula: Distributed Edge Cloud for Data-Intensive Computing", IEEE, 2014, pp. 491-492.
Office Action in Chinese Application No. 202110268031.5, dated Sep. 3, 2021.
Office Action in Chinese Application No. 201680020768.2 dated Sep. 24, 2021 in 20 pages.
Office Action in Indian Application No. 201817013748 dated Nov. 20, 2020.
Anonymous: "Amazon Elastic Compute Cloud User Guide for Linux Instances—first 400 pages of 795," Apr. 8, 2016 (Apr. 8, 2016_, XP055946665, Retrieved from the Internet: URL:https://web.archive.org/web/20160408211543if_/http://docs.aws.amazon.com/AWSEC2/latest/UserGuide/ec2-ug.pdf (retrieved on Jul. 27, 2022] 795 pages.
Anonymous: "Amazon Cognito Developer Guide," Jun. 24, 2001, XP093030075, retrieved from the internet: URL:https://web.archive.org/web/20210624153941if_/https://docs.aws.amazon.com/cognito/latest/developerguide/cognito-dg.pdf [retrieved on Mar. 9, 2023] the whole document.
Anonymous: "Amazon Simple Workflow Service Developer Guide API Version Jan. 25, 2012," Jun. 11, 2016 (Jun. 11, 2016), XP055946928, Retrieved from the Internet: URL:https://web.archive.org/web/20160111075522if_/http://docs.aws.amazon.com/amazonswf/latest/developerguide/swf-dg.pdf [retrieved on Jul. 28, 2022] in 197 pages.
Anonymous: "alias (command)—Wikipedia," Jun. 28, 2016, pp. 106, XP093089956, Retrieved from the Internet: URL:https://en.wikipedia.org/w/index.php?title=Alias_(command)&oldid=727315645 [retrieved on Oct. 9, 2023.
Anonymous: "AWS Flow Framework for Java," Apr. 7, 2016 (Apr. 7, 2016), XP055946535, Retrieved from the Internet: URL:https://web.archive.org/web/20160407214715if_/http://docs.aws.amazon.com/amazonswf/latest/awsflowguide/swf-aflow.pdf, [retrieved Jul. 27, 2022] in 139 pages.
Anonymous: "AWS Lambda Developer Guide," Jul. 1, 2021, XP093024770, retrieved from the internet: URL:https://web.archive.org/web/20210701100128if_/https://docs.aws.amazon.com/lambda/latest/dg/lambda-dg.pdf [retrieved on Feb. 17, 2023] the whole document.
Anonymous: "AWS Lambda Developer Guide," Jul. 1, 2021, XP093024770, retrieved from the internet: URL:https://web.archieve.org/web/20210701100128if_/https://docs.aws.amazon.com/lambda/latest/dg/lambda-dg.pdf [retrieved on Feb. 17, 2023] the whole document.
Anonymous: SaaS Tenant Isolution Strategies Isolating Resources in a Multi-Tenant Environment,: Aug. 1, 2020, XP093030095, retrieved from the internet: URL:https://dl.awsstatic.com/whitepapers/saas-tenant-isolation-strategies.pdf [retrieved on Mar. 9, 2023] the whole document.
Anonymous: "Security Overview of AWS Lambda," Aug. 11, 2021, XP093030100, retrieved from the internet: URL:https://web.archive.org/web/20210811044132if_/https://docs.aws.amazon.com/whitepapers/latest/security-overview-aws-lambda/security-overview-aws-lambda.pdf [retrieved Mar. 9, 2023] the whole document.
Abebe et al., "EC-Store: Bridging the Gap Between Storage and Latency in Distribute Erasure Coded Systems", IEEE 38th International Conference on Distributed Computing Systems, 2018, pp. 255-266.
Al-Ali, et al., Making Serverless Computing More Serverless. 2018 IEEE 11th International Conference on Cloud Computing (CLOUD). Https://ieeexplore.ieee.org/stamp/stamp.jsp?tp=&amumber=8457832 (Year: 2018).
Gimenez-Alventosa, et al., tAsCAAs: a Multi-Tenant Serverless Task Scheduler and Load Balancer as a Service. IEEE Access, vol. 9. https://ieeexplore.ieee.org/stamp/stamp.jsp?tp=&amumber=9528423 (Year: 2021).
Huang et al., "Erasure Coding in Windows Azure Storege", USENIX, 2012 in 12 pages.

(56) References Cited

OTHER PUBLICATIONS

Khedekar, et al., Multi-Tenant Big Data Analytics on AWS Cloud Platform. 2020 10th Annual Computing and Communication Workshop and Conference (CCWC). Https://ieeexplore.ieee.org/stamp/staum.jsp?tp=&amumber=9031133 (Year: 2020).

Rashmi et al., "EC-Cache: Load-Balance, Low-Latency Cluster Caching with Online Erasure Coding", USENIX, 2016, pp. 401-417.

Sharma A. et al., "Building a Multi-Tenant SaaS Solution Using AWS Serverless Services," Aug. 26, 2021, XP093030094, retrieved from the internet: URL:https://aws.amazon.com/blogs/apn/building-a-multi-tenant-saas-solution-using-aws-serverless-services/ [retrieved on Mar. 9, 2023] the whole document.

Zheng, et al., "A Multi-Tenant Framework for Cloud Container Services," 2021 IEEE 41st International Conference on Distributed Computer Systems (ICDCS). Https://ieeexplore.ieee.org/stamp/stamp.jsp?tp=&amumber=9546534 (Year: 2021).

\* cited by examiner

APPLICATION GATEWAYS IN AN ON-DEMAND NETWORK CODE EXECUTION SYSTEM

BACKGROUND

Generally described, computing devices can utilize communication networks to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, hosted computing environments or data processing centers, generally referred to herein as "data centers," may include a number of interconnected computing systems to provide computing resources to users of the data center. The data centers may be private data centers operated on behalf of an organization, or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computing resources from a data center, such as single computing devices or a configuration of networked computing devices, and be provided with varying numbers of virtual machine resources.

In some scenarios, a user can request that a data center provide computing resources to execute a particular task. The task may correspond to a set of computer-executable instructions, which the data center may then execute on behalf of the user. The data center may thus further facilitate increased utilization of data center resources.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
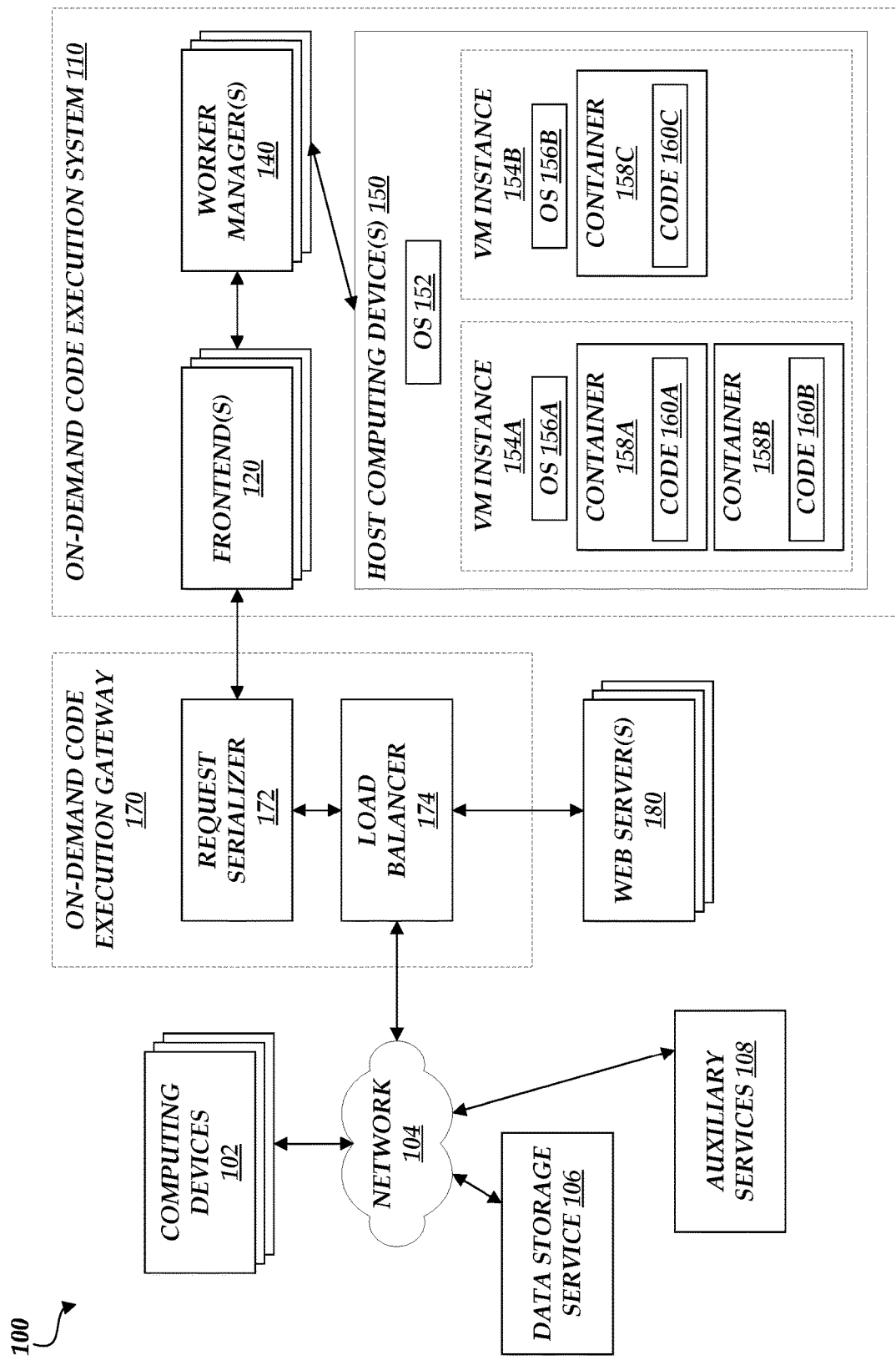
FIG. 1 is a block diagram depicting an illustrative environment in which an on-demand code execution gateway facilitates access to an on-demand code execution system in accordance with aspects of the present disclosure.

Generally described, aspects of the present disclosure relate to an on-demand code execution system. The on-demand code execution system enables rapid execution of code, which may be supplied by users of the on-demand code execution system. More specifically, embodiments of the present disclosure relate to an on-demand code-execution gateway, which facilitates access to the on-demand code execution system. As described in detail herein, the on-demand code execution system may provide a network-accessible service enabling users to submit or designate computer-executable code to be executed by isolated execution environments on the on-demand code execution system. Each set of code on the on-demand code execution system may define a "task," and implement specific functionality corresponding to that task when executed on an execution environment, such as a virtual machine instance, of the on-demand code execution system. Individual implementations of the task on the on-demand code execution system may be referred to as an "execution" of the task (or a "task execution"). The on-demand code execution system can further enable users to trigger execution of a task based on a variety of potential events, such as detecting new data at a network-based storage system, transmission of an application programming interface ("API") call to the on-demand code execution system, or transmission of a specially formatted hypertext transport protocol ("HTTP") packet to the on-demand code execution system. Thus, users may utilize the on-demand code execution system to execute any specified executable code "on-demand," without requiring configuration or maintenance of the underlying hardware or infrastructure on which the code is executed. Further, the on-demand code execution system may be configured to execute tasks in a rapid manner (e.g., in under 100 milliseconds [ms]), thus enabling execution of tasks in "real-time" (e.g., with little or no perceptible delay to an end user).

The on-demand code execution system may thus allow users to execute code in a "serverless" environment (e.g., one in which the underlying server is not under user control), but may require that user requests to execute code in the environment meet criteria that would not otherwise be applicable. For example, the on-demand code execution system may require that code execution requests be authenticated with a cryptographic signature, submitted in a particular format, submitted via an API, or meet other requirements. In some aspects, satisfying these criteria may require computing resources that a computing device does not have. For example, an "Internet of Things" ("IoT") device may have limited processing power or memory, and thus may not have sufficient computing resources to generate a cryptographic signature or convert a request to a particular format. Additionally, in some aspects, the on-demand code execution system may provide output in a particular format, and a computing device with limited computing resources may not understand the format or have the resources to translate it.

An on-demand code execution gateway may thus provide an interface that allows computing devices to interact with an on-demand code execution system regardless of whether the computing devices are capable of providing input in the format expected by the system or parsing output in the format provided by the system. The on-demand code execution gateway may thus allow computing devices to interact with code executing in the serverless on-demand environment as though the code were executing on a conventional server, and may thereby allow the on-demand code execution system to be utilized more efficiently. In some embodiments, computing devices may request a network resource or service, such as access to a web page, web-based application, database, file, image, media content, data stream, or the like. The on-demand code execution gateway may determine whether to fulfill the request by sending it to a server specifically configured to handle the request, or by generating and sending a request for on-demand code execution and then processing the resulting output.

The term "serverless environment," as used herein, is intended to refer to an environment in which responsibility for managing generation, configuration, and state of an underlying execution environment is abstracted away from a user, such that the user need not, for example, create the execution environment, install an operating system within the execution environment, or manage a state of the environment in order to execute desired code in the environment. Similarly, the term "server-based environment" is intended to refer to an environment in which a user is at least partly responsible for managing generation, configuration, or state of an underlying execution environment in addition to executing desired code in the environment. One skilled in the art will thus appreciate that "serverless" and "server-based" may indicate the degree of user control over execution environments in which code is executed, rather than the actual absence or presence of a server.

In some embodiments, a user who submits a task to an on-demand code execution system may register the task with the on-demand code execution gateway or otherwise configure the gateway to invoke the on-demand code execution system. For example, the user may provide credentials that the on-demand code execution gateway may use to authenticate itself to the on-demand code execution system and submit a request to execute a task. As a further example, the user may specify one or more uniform resource locators ("URLs") corresponding to requests that the gateway can fulfill by invoking on-demand code execution of a specified task. The on-demand code execution gateway may thus identify requests that can be fulfilled by invoking on-demand code execution of a user-submitted task.

As will be appreciated by one of skill in the art in light of the present disclosure, the embodiments disclosed herein improves the ability of computing systems, such as on-demand code execution systems, to execute code in an efficient manner. Moreover, the presently disclosed embodiments address technical problems inherent within computing systems; specifically, the problem of devices with limited computing resources being unable to utilize on-demand code execution systems due to computationally expensive requirements for providing input and output to these systems. These technical problems are addressed by the various technical solutions described herein, including the provisioning of an on-demand code execution gateway. Thus, the present disclosure represents an improvement on existing data processing systems and computing systems in general.

As described in more detail below, the on-demand code execution system may include a worker manager configured to receive user code (threads, programs, etc., composed in any of a variety of programming languages) and execute the code in a highly scalable, low latency manner, without requiring user configuration of a virtual machine instance. Specifically, the worker manager can, prior to receiving the user code and prior to receiving any information from a user regarding any particular virtual machine instance configuration, create and configure virtual machine instances according to a predetermined set of configurations, each corresponding to any one or more of a variety of run-time environments. Thereafter, the worker manager receives user-initiated requests to execute code, and identifies a pre-configured virtual machine instance to execute the code based on configuration information associated with the request. The worker manager can further allocate the identified virtual machine instance to execute the user's code at least partly by creating and configuring containers inside the allocated virtual machine instance, and provisioning the containers with code of the task as well as an dependency code objects. Various embodiments for implementing a worker manager and executing user code on virtual machine instances is described in more detail in U.S. Pat. No. 9,323,556, entitled "PROGRAMMATIC EVENT DETECTION AND MESSAGE GENERATION FOR REQUESTS TO EXECUTE PROGRAM CODE," and filed Sep. 30, 2014 (the "'556 Patent"), the entirety of which is hereby incorporated by reference.

As used herein, the term "virtual machine instance" is intended to refer to an execution of software or other executable code that emulates hardware to provide an environment or platform on which software may execute (an "execution environment"). Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used as well.

While a virtual machine executing an operating system is described herein as one example of an execution environment, other execution environments are also possible. For example, tasks or other processes may be executed within a software "container," which provides a runtime environment without itself providing virtualization of hardware. Containers may be implemented within virtual machines to provide additional security, or may be run outside of a virtual machine instance.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

FIG. 1 is a block diagram of an illustrative operating environment 100 in which an on-demand code execution gateway 170 may operate based on communications with an on-demand code execution system 110, web servers 180, computing devices 102, auxiliary services 106, and network-based data storage services 108. In general, the computing devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The on-demand code execution gateway 170 may provide the computing devices 102 with one or more user interfaces for invoking user-provided code (e.g., submitting a request to execute the user code on the on-demand code execution system 110). In some embodiments, the on-demand code execution gateway 170 may provide the computing devices 102 with an interface that allows the on-demand code execution gateway 170 to determine whether requests to execute code will be fulfilled by the on-demand code execution system 110 or one or more web servers 180. For example, the on-demand code execution gateway 170 may provide an interface that accepts input in a format understood by the web servers 180 (e.g., an HTTP "POST" method), and may determine whether to pass this input to the web servers 180 or translate it into a format understood by the on-demand code execution system 110.

The on-demand code execution gateway 170 includes a load balancer 174, which implements aspects of the present disclosure including, for example, providing an interface to the on-demand code execution system 110 that allows computing devices 102 to request execution of code on the system 110 without performing such actions as authenticating the request, generating the request into a format expected by the system 110, buffering and serializing the request, and other actions as described in more detail below. The on-demand code execution gateway 170 further includes a request serializer 172, which may serialize input and de-serialize output of the system 110 to facilitate communication between the system 110 and the computing devices 102. In some embodiments, the request serializer 172 may manage connections to the on-demand code execution system 110. For example, the request serializer 172 may maintain a connection to a frontend 120 to reduce the overhead costs associated with setting up and tearing down connections on a per-request basis.

In some embodiments, the load balancer 174 may interact with and distribute requests between a number of web servers 180. In further embodiments, as described in more detail below, the load balancer 174 may distribute requests to the on-demand code execution system 110 based on the workload of the web servers 180 or other criteria. The on-demand code execution gateway 170 may thus receive requests that can be fulfilled by the web servers 180, and the load balancer 174 may determine that the request should instead be fulfilled by the on-demand code execution system 110.

In some embodiments, the on-demand code execution system 110 may provide one or more user interfaces, command-line interfaces (CLIs), application programing interfaces (APIs), and/or other programmatic interfaces for generating and uploading user-executable code (e.g., including metadata identifying dependency code objects for the uploaded code), invoking the user-provided code (e.g., submitting a request directly to the on-demand code execution system 110, in a format understood by that system, to execute user-submitted code), scheduling event-based jobs or timed jobs, tracking the user-provided code, and/or viewing other logging or monitoring information related to their requests and/or user code. Although one or more embodiments may be described herein as using a user interface, it should be appreciated that such embodiments may, additionally or alternatively, use any CLIs, APIs, or other programmatic interfaces.

The illustrative environment 100 further includes one or more network-based data storage services 108, configured to enable the on-demand code execution system 110 to store and retrieve data from one or more persistent or substantially persistent data sources. Illustratively, the network-based data storage services 108 may enable the on-demand code execution system 110 to store information corresponding to a task, such as code or metadata, to store additional code objects representing dependencies of tasks, to retrieve data to be processed during execution of a task, and to store information (e.g., results) regarding that execution. The network-based data storage services 108 may represent, for example, a relational or non-relational database. In another example, the network-based data storage services 108 may represent a network-attached storage (NAS), configured to provide access to data arranged as a file system. The network-based data storage services 108 may further enable the on-demand code execution system 110 to query for and retrieve information regarding data stored within the on-demand code execution system 110, such as by querying for a number of relevant files or records, sizes of those files or records, file or record names, file or record creation times, etc. In some instances, the network-based data storage services 108 may provide additional functionality, such as the ability to separate data into logical groups (e.g., groups associated with individual accounts, etc.). While shown as distinct from the auxiliary services 106, the network-based data storage services 108 may in some instances also represent a type of auxiliary service 106.

The computing devices 102, auxiliary services 106, and network-based data storage services 108 may communicate with the on-demand code execution gateway 170 via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein. In some embodiments, the on-demand code execution gateway 170 may communicate with the web servers 180 or the on-demand code execution system 110 via the network 104 or another network.

The on-demand code execution system 110, on-demand code execution gateway 170, and web servers 180 are depicted in FIG. 1 as operating in a distributed computing environment including several computer systems that are interconnected using one or more computer networks (not shown in FIG. 1). The system 110, gateway 170, and servers 180 could also operate within a computing environment having more or fewer devices than are illustrated in FIG. 1. Additionally, while shown as separate systems, the system 110, gateway 170, and servers 180 (or any combination thereof) may in some embodiments be implemented as a single system. Thus, the depictions of the system 110, gateway 170, and servers 180 in FIG. 1 should be taken as illustrative and not limiting to the present disclosure. For example, the on-demand code execution system 110, the gateway 170, and/or the servers 180 (or various constituents thereof) could implement various Web services components, hosted or "cloud" computing environments, and/or peer to peer network configurations to implement at least a portion of the processes described herein.

Further, the on-demand code execution system 110, the on-demand code execution gateway 170, and the web servers 180 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

In some embodiments, any of the components within the on-demand code execution system 110 can communicate with other components of the on-demand code execution system 110 via the network 104. In other embodiments, not all components of the on-demand code execution system 110 are capable of communicating with other components of the environment 100. In one example, only the frontend 120 (which may in some instances represent multiple frontends 120) may be connected to the gateway 170 or the network 104, and other components of the on-demand code execution system 110 may communicate with other components of the environment 100 via the frontends 120.

The on-demand code execution system 110 includes one or more frontends 120, which enable interaction with the on-demand code execution system 110. In an illustrative embodiment, the frontends 120 serve as an interface allowing the on-demand code execution gateway 170 to request execution of user-submitted code. In some embodiments, the frontends 120 also serve as a "front door" to other services provided by the on-demand code execution system 110, enabling users to, for example provide computer executable code. The frontends 120 include a variety of components to enable interaction between the on-demand code execution system 110 and other computing devices. For example, each frontend 120 may include a request interface providing computing devices 102 with the ability to upload or otherwise communicate user-specified code to the on-demand code execution system 110, and may enable computing devices 102 that are capable of doing so to request execution of that code without going through the gateway 170. In one embodiment, the request interface communicates with external computing devices (e.g., computing devices 102, auxiliary services 106, etc.) via a graphical user interface (GUI), CLI, or API. The frontends 120 process the requests and makes sure that the requests are properly authorized. For example, the frontends 120 may determine whether the user associated with the request is authorized to access the user code specified in the request. In the illustrated embodiment of FIG. 1, the frontends 120 may determine whether the on-demand code execution gateway 170 has been authorized to access the user code specified in a request.

References to user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific function, for example, in connection with a particular web application or mobile application developed by the user. As noted above, individual collections of user code (e.g., to achieve a specific function) are referred to herein as "tasks," while specific executions of that code (including, e.g., compiling code, interpreting code, or otherwise making the code executable) are referred to as "task executions" or simply "executions." Tasks may be written, by way of non-limiting example, in JavaScript (e.g., node.js), Java, Python, and/or Ruby (and/or another programming language). Tasks may be "triggered" for execution on the on-demand code execution system 110 in a variety of manners. In one embodiment, a user or other computing device may transmit a request to execute a task may, which can generally be referred to as "call" to execute of the task. Such calls may include the user code (or the location thereof) to be executed and one or more arguments to be used for executing the user code. For example, a call may provide the user code of a task along with the request to execute the task. In another example, a call may identify a previously uploaded task by its name or an identifier. In yet another example, code corresponding to a task may be included in a call for the task, as well as being uploaded in a separate location (e.g., storage of an auxiliary service 106 or a storage system internal to the on-demand code execution system 110) prior to the request being received by the on-demand code execution system 110. As noted above, the code for a task may reference additional code objects maintained at the on-demand code execution system 110 by use of identifiers of those code objects, such that the code objects are combined with the code of a task in an execution environment prior to execution of the task. The on-demand code execution system 110 may vary its execution strategy for a task based on where the code of the task is available at the time a call for the task is processed. A request interface of the frontend 120 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface.

To manage requests for code execution, the frontend 120 can include an execution queue (not shown in FIG. 1), which can maintain a record of requested task executions. Illustratively, the number of simultaneous task executions by the on-demand code execution system 110 is limited, and as such, new task executions initiated at the on-demand code execution system 110 (e.g., via an API call, via a call from an executed or executing task, etc.) may be placed on the execution queue and processed, e.g., in a first-in-first-out order. In some embodiments, the on-demand code execution system 110 may include multiple execution queues, such as individual execution queues for each user account. For example, users of the on-demand code execution system 110 may desire to limit the rate of task executions on the on-demand code execution system 110 (e.g., for cost reasons). Thus, the on-demand code execution system 110 may utilize an account-specific execution queue to throttle the rate of simultaneous task executions by a specific user account. In some instances, the on-demand code execution system 110 may prioritize task executions, such that task executions of specific accounts or of specified priorities bypass or are prioritized within the execution queue. In other instances, the on-demand code execution system 110 may execute tasks immediately or substantially immediately after receiving a call for that task, and thus, the execution queue may be omitted.

The frontend 120 can further include an output interface (not shown in FIG. 1) configured to output information regarding the execution of tasks on the on-demand code execution system 110. Illustratively, the output interface may transmit data regarding task executions (e.g., results of a task, errors related to the task execution, or details of the task execution, such as total time required to complete the execution, total data processed via the execution, etc.) to the on-demand code execution gateway 170, computing devices 102, or to auxiliary services 106, which may include, for example, billing or logging services. The output interface may further enable transmission of data, such as service calls, to auxiliary services 106. For example, the output interface may be utilized during execution of a task to transmit an API request to an external service 106 (e.g., to store data generated during execution of the task).

To execute tasks, the on-demand code execution system 110 includes one or more worker managers 140 that manage the instances used for servicing incoming calls to execute tasks. In the example illustrated in FIG. 1, each worker manager 140 manages an active pool of virtual machine instances 154A-B, which are currently assigned to one or more users and are implemented by one or more physical host computing devices 150. The physical host computing devices 150 and the virtual machine instances 154A-B may further implement one or more containers 158A-C, which may contain and execute one or more user-submitted codes 160A-G. Containers are logical units created within a virtual machine instance, or on a host computing device, using the resources available on that instance or device. For example, each worker manager 140 may, based on information specified in a call to execute a task, create a new container or locate an existing container 158A-C and assign the container to handle the execution of the task.

The containers 156A-C, virtual machine instances 154A-B, and host computing devices 150 may further include language runtimes, code libraries, or other supporting functions (not depicted in FIG. 1) that facilitate execution of user-submitted code 160A-C. The physical computing devices 150 and the virtual machine instances 154A-B may further include operating systems 152 and 156A-B. In various embodiments, operating systems 152 and 156A-B may be the same operating system, variants of the same operating system, different operating systems, or combinations thereof.

Although the virtual machine instances 154A-B are described here as being assigned to a particular user, in some embodiments, an instance 154A-B may be assigned to a group of users, such that the instance is tied to the group of users and any member of the group can utilize resources on the instance. For example, the users in the same group may belong to the same security group (e.g., based on their security credentials) such that executing one member's task in a container on a particular instance after another member's task has been executed in another container on the same instance does not pose security risks. Similarly, the worker managers 140 may assign the instances and the containers according to one or more policies that dictate which requests can be executed in which containers and which instances can be assigned to which users. An example policy may specify that instances are assigned to collections of users who share the same account (e.g., account for accessing the services provided by the on-demand code execution system 110). In some embodiments, the requests associated with the same user group may share the same containers (e.g., if the user codes associated therewith are identical). In some embodiments, a task does not differentiate between the different users of the group and simply indicates the group to which the users associated with the task belong.

Once a triggering event to execute a task has been successfully processed by a frontend 120, the frontend 120 passes a request to a worker manager 140 to execute the task. In one embodiment, each frontend 120 may be associated with a corresponding worker manager 140 (e.g., a worker manager 140 co-located or geographically nearby to the frontend 120) and thus the frontend 120 may pass most or all requests to that worker manager 140. In another embodiment, a frontend 120 may include a location selector configured to determine a worker manager 140 to which to pass the execution request. In one embodiment, the location selector may determine the worker manager 140 to receive a call based on hashing the call, and distributing the call to a worker manager 140 selected based on the hashed value (e.g., via a hash ring). Various other mechanisms for distributing calls between worker managers 140 will be apparent to one of skill in the art. In accordance with embodiments of the present disclosure, the worker manager 140 can determine a host computing device 150 or a virtual machine instance 154A-B for executing a task.

As shown in FIG. 1, various combinations and configurations of host computing devices 150, virtual machine instances 154A-B, and containers 158A-C may be used to facilitate execution of user submitted code 160A-C. In the illustrated example, the host computing device 150 implements two virtual machine instances 154A and 154B. Virtual machine instance 154A, in turn, implements two containers 158A and 158B, which contain user-submitted code 160A and 160B respectively. Virtual machine instance 154B implements a single container 158C, which contains user-submitted code 160C. It will be understood that these embodiments are illustrated for purposes of example, and that many other embodiments are within the scope of the present disclosure.

While some functionalities are generally described herein with reference to an individual component of the on-demand code execution system 110, other components or a combination of components may additionally or alternatively implement such functionalities. For example, a worker manager 140 may operate to provide functionality associated with execution of user-submitted code as described herein with reference to an on-demand code execution gateway 170.

Figure 2:
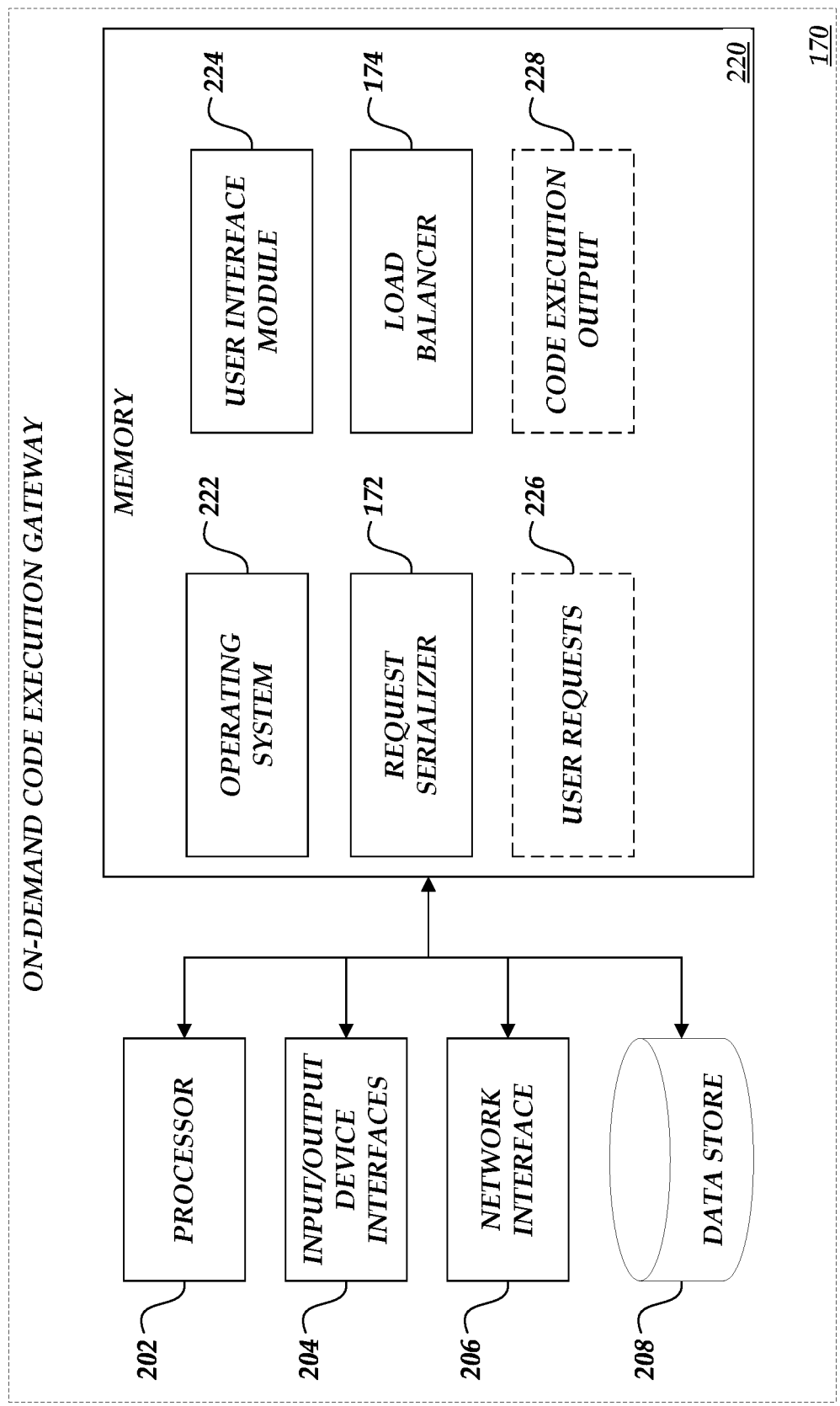
FIG. 2 depicts a general architecture of a computing device providing the on-demand code execution gateway depicted in FIG. 1.

FIG. 2 depicts a general architecture of a computing system (referenced as on-demand code execution gateway 170) that operates to provide an interface to the on-demand code execution system 110. The general architecture of the on-demand code execution gateway 170 depicted in FIG. 2 includes an arrangement of computer hardware and software modules that may be used to implement aspects of the present disclosure. The hardware modules may be implemented with physical electronic devices, as discussed in greater detail below. The on-demand code execution gateway 170 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1. As illustrated, the on-demand code execution gateway 170 includes a processor 202, input/output device interfaces 204, a network interface 206, and a data store 208, all of which may communicate with one another by way of a communication bus. The network interface 206 may provide connectivity to one or more networks or computing systems. The processor 202 may thus receive information and instructions from other computing systems or services via the network 104. The processor 202 may also communicate to and from a memory 220 and further provide output information for an optional display (not shown) via the input/output device interfaces 204. The input/output device interfaces 204 may also accept input from an optional input device (not shown).

The memory 220 may contain computer program instructions (grouped as modules in some embodiments) that the processor 202 executes in order to implement one or more aspects of the present disclosure. The memory 220 generally includes random access memory (RAM), read only memory (ROM) and/or other persistent, auxiliary or non-transitory computer readable media. The memory 220 may store an operating system 222 that provides computer program instructions for use by the processor 202 in the general administration and operation of the on-demand code execution gateway 170. The memory 220 may further include computer program instructions and other information for implementing aspects of the present disclosure. For example, in one embodiment, the memory 220 includes a user interface module 224 that generates interfaces (and/or instructions therefor) that enable access to the on-demand code execution server 110. In addition, the memory 220 may include and/or communicate with one or more data repositories (not shown), for example, to access user program codes and/or libraries.

In addition to and/or in combination with the user interface module 224, the memory 220 may include a request serializer 172 and a load balancer 174 that may be executed by the processor 202. In one embodiment, the request serializer 172 and load balancer 174 individually or collectively implement various aspects of the present disclosure, e.g., processing request for network resources and serializing them into a format understood by an on-demand code execution server 110, as described further below.

While the request serializer 172 and load balancer 174 are shown in FIG. 2 as part of the on-demand code execution gateway 170, in other embodiments, all or a portion of the request serializer 172 and load balancer 174 may be implemented by other components of the on-demand code execution system 110 and/or another computing device. For example, in certain embodiments of the present disclosure, another computing device in communication with the on-demand code execution system 110 may include several modules or components that operate similarly to the modules and components illustrated as part of the on-demand code execution gateway 170.

The memory 220 may further include user requests 226, which may be loaded into memory in conjunction with a user-submitted request that can be fulfilled by executing a task on the on-demand code execution system 110. The memory 220 may further include execution output 228, which may be received from the on-demand code execution system 110 after a task has been executed.

In some embodiments, the on-demand code execution gateway 170 may further include components other than those illustrated in FIG. 2. For example, the memory 220 may further include information regarding various user-submitted codes that are available for execution, authentication information for accessing various user-submitted codes, or metadata or other information that was submitted with the request. FIG. 2 is thus understood to be illustrative but not limiting.

Figure 3A:
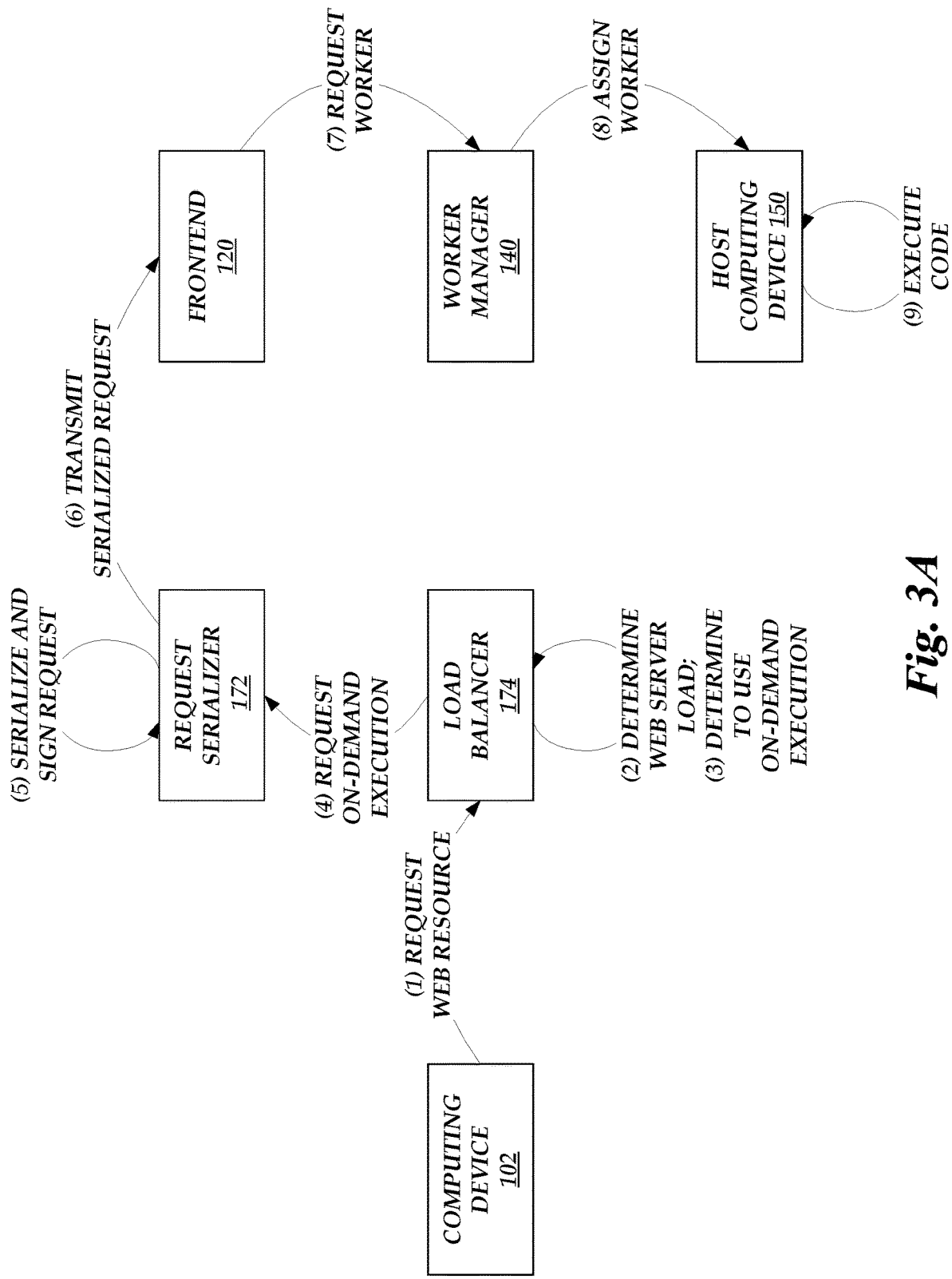
FIGS. 3A and 3B are flow diagrams depicting illustrative interactions for using an on-demand code execution gateway to allow an on-demand code execution system to fulfill requests for network resources in accordance with aspects of the present disclosure.
Figure 3B:
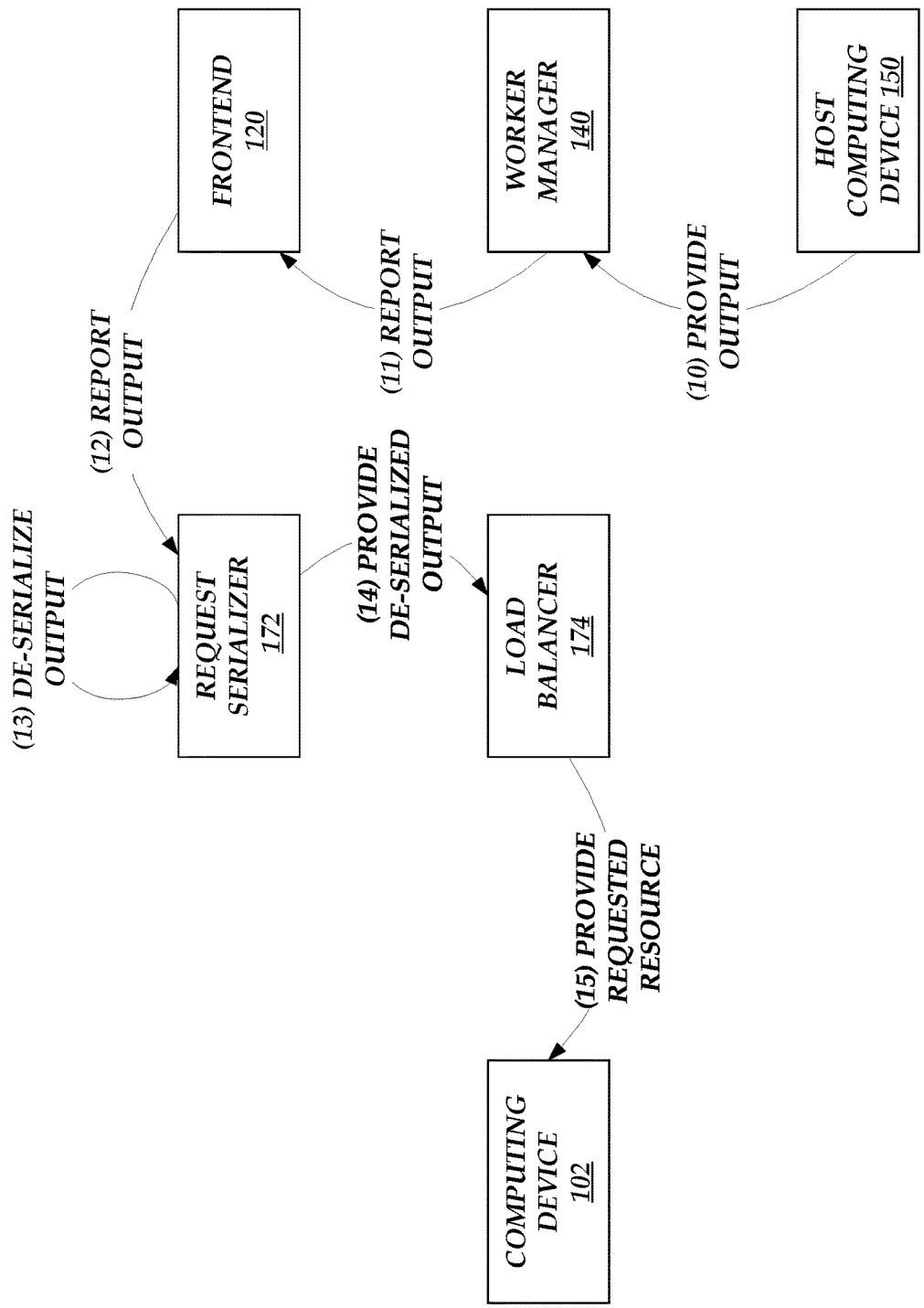

FIGS. 3A and 3B depict illustrative interactions for fulfilling requests for computing resources, such as requests to access a web page or a web-based application, via an on-line code execution gateway. With reference now to FIG. 3A, at (1), a computing device 102 requests a network resource. Illustratively, the request may be in the form of a Uniform Resource Locator ("URL"), which may be transmitted by the computing device to the load balancer 174. At (2), in some embodiments, the load balancer 174 assesses the current workloads of the servers it balances (which are not depicted in FIG. 3A) to determine whether any of these servers have capacity to fulfill the request. In some embodiments, the load balancer 174 may obtain server load information from the servers in the form of processor utilization metrics, memory usage, and other such measurements. In other embodiments, the load balancer 174 may determine server load based on the volume and frequency of requests that it has assigned.

In some embodiments, the load balancer 174 determines that one of its servers has sufficient capacity to fulfill the request, and assigns the request to the server. In other embodiments, at (3), the load balancer 174 determines that none of its servers currently have sufficient capacity to fulfill the request, and thus determines to fulfill the request using on-demand execution. In some embodiments, the load balancer 174 may determine to use on-demand execution for reasons other than server load. For example, the load balancer 174 may determine that on-demand code execution will make better use of computing resources, will provide better performance (e.g., faster results), provide lower latency for certain requests, or apply other criteria to make the determination to use on-demand execution. Having made such a determination, at (4), the load balancer 174 then passes the request to the request serializer 172.

In some embodiments, the load balancer 174 may act as a firewall that prevents malformed or malicious requests from reaching an on-demand code execution system and/or other servers. For example, the load balancer 174 may authenticate a request it receives by, e.g., exchanging tokens or otherwise verifying the source of the request. In further embodiments, the load balancer 174 may throttle requests to the on-demand code execution system or otherwise protect the integrity of the on-demand code execution system.

In some embodiments, the load balancer 174 may determine that the numbers of servers in its server pool should be increased based on the number of requests that the servers are unable to fulfill due to load, or may determine the number of servers may be decreased if few or no requests are being fulfilled via on-demand code execution. The load balancer 174 may analyze the quantity and timing of the requests it receives, and may assess the cost-benefit tradeoff of instantiating additional servers. For example, the load balancer 174 may determine that it is experiencing a temporary "spike" or increase in traffic, and that the spike will be over before it can bring additional servers online. As a further example, the load balancer 174 may determine that few or no requests are being fulfilled via on-demand code execution, and server workloads are such that the number of servers can be reduced. In some embodiments, the number of servers may be reduced to zero (e.g., a determination may be made that all requests should be fulfilled via on-demand code execution). In some embodiments, the load balancer 174 or another component of the on-demand code execution gateway 170 may perform a cost-benefit analysis of adding or removing a server, and may consider factors such as request response times, idle capacity, costs associated with on-demand code execution, costs associated with maintaining a server, and other factors.

At (4), the load balancer 174 may pass the request for a network resource to the request serializer 172, which may encode the request into a format accepted by an on-demand code execution system. Illustratively, the on-demand code execution system may require that requests be in a particular format. For example, the system may require that a request include certain headers or other metadata in a particular format, or that the body of the request be formatted as a base64-encoded JavaScript Object Notation ("JSON") string or blog.

At (5), the request serializer 172 serializes the request. Illustratively, the request may be serialized by converting it to a format that is accepted by an on-demand code execution system, or by generating a "blank" request in an accepted format and populating it with information from the originally received request. In some embodiments, the request serializer 172 may generate a hash key, signature, token, or other identifier to allow the on-demand code execution system to authenticate the request. The request serializer 172 may also provide other information that is absent from the originally received request but required by the on-demand code execution system, such as information identifying the particular task or user-submitted code that may be executed to fulfill the request. In some embodiments, the request serializer 172 or the load balancer 174 may determine the appropriate task to execute based on characteristics of the request, such as an originating IP address, destination IP address, information contained in a URL string or in HTTP headers, or other characteristics.

In some embodiments, as described above, the request for a network resource may not be received all at once. For example, the request may be to process an image, data file, or other binary object, and the body of the request may include the object and may be distributed across multiple packets or messages. The request serializer 172 may thus buffer portions of the request until a complete request has been received, so that the entire request can be signed and provided to the on-demand code execution system.

At (6), the serialized request, which may also be referred to herein as an "encoded input," is transmitted to a frontend 120 of an on-demand code execution system. The frontend 120 processes the serialized request, identifies a suitable worker manager 140, and at (7) requests that the worker manager 140 assign a worker to execute the requested code. At (8), the worker manager 140 identifies a host computing device 150 that can instantiate a "worker" execution environment (e.g., a virtual machine instance or a container within a virtual machine instance) to execute the task, and assigns the task to the execution environment on the host computing device 150. In some embodiments, the worker manager 140 may identify an existing execution environment to execute the task and assign the task accordingly. At (9), the execution environment on the host computing device 150 executes the task.

In some embodiments, the load balancer 174 or the request serializer 172 may interact with multiple frontends 120 or multiple code on-demand code execution systems, and may assign requests to different frontends, different on-demand code execution systems, or different tasks within an on-demand code execution system. For example, the load balancer 174 may assign requests to be fulfilled by a high-performance task that consumes more computing resources when load on the on-demand code execution system is low, and may assign requests to be fulfilled by a task that consumes fewer resources but still produces acceptable results when load is high. The load balancer 174 or the request serializer 172 may, in some embodiments, perform a periodic or demand-driven health check on the frontends 120, on-demand code execution systems, or executing tasks, and may fail over to a different frontend 120, on-demand code execution system, or task if the health check indicates a problem with task execution.

With reference now to FIG. 3B, at (10), the host computing device 150 provides the output of executing the task to the worker manager 140, who at (11) reports the output to the frontend 120. At (12), the frontend 120 provides the output to the request serializer 172. In some embodiments, the host computing device 150 or the worker manager 140 may communicate directly with the request serializer 172, and some or all of the interactions at (10), (11), and (12) may be combined. In some embodiments, the output may be encoded or serialized. For example, the output may be in a format that corresponds to the encoded input, such as a response to an API call, or may have headers or metadata that correspond to headers or metadata in the encoded input.

At (13), the request serializer 172 de-serializes the output. Illustratively, de-serializing the output may convert the output to a format expected by the computing device 102, such as an HTTP response that corresponds to the original request. In some embodiments, the request serializer 172 may remove or convert metadata associated with the output. For example, the request serializer 172 may move metadata into optional HTTP headers, or may make the output similar or identical to the output that a server-based application would have generated. In some embodiments, the output may include status messages or error messages that are specific to the on-demand code execution system, which may be translated or converted into status or error messages in another format (e.g., into the equivalent message that would have been generated by a server-based application), or may be retained in the converted output as indications that the request was fulfilled by an on-demand code execution system. At (14), the request serializer provides the decoded or de-serialized output to the load balancer 174, when at (15)

provides the output to the requesting computing device 102 as a response to the original request.

In some embodiments, the ordering and implementation of operations described above may be modified, or these interactions may be carried out by additional or alternative elements of the on-demand code execution gateway 170. For example, in some embodiments, the interactions at (2) and (3) may be omitted and the load balancer 174 may fulfill all requests by utilizing the on-demand code execution system. As a further example, in some embodiments, the request serializer 172 may bypass the frontend 120 and communicate directly with the worker manager 140. The interactions depicted in FIGS. 3A-3B are thus understood to be illustrative and not limiting.

Figure 4:
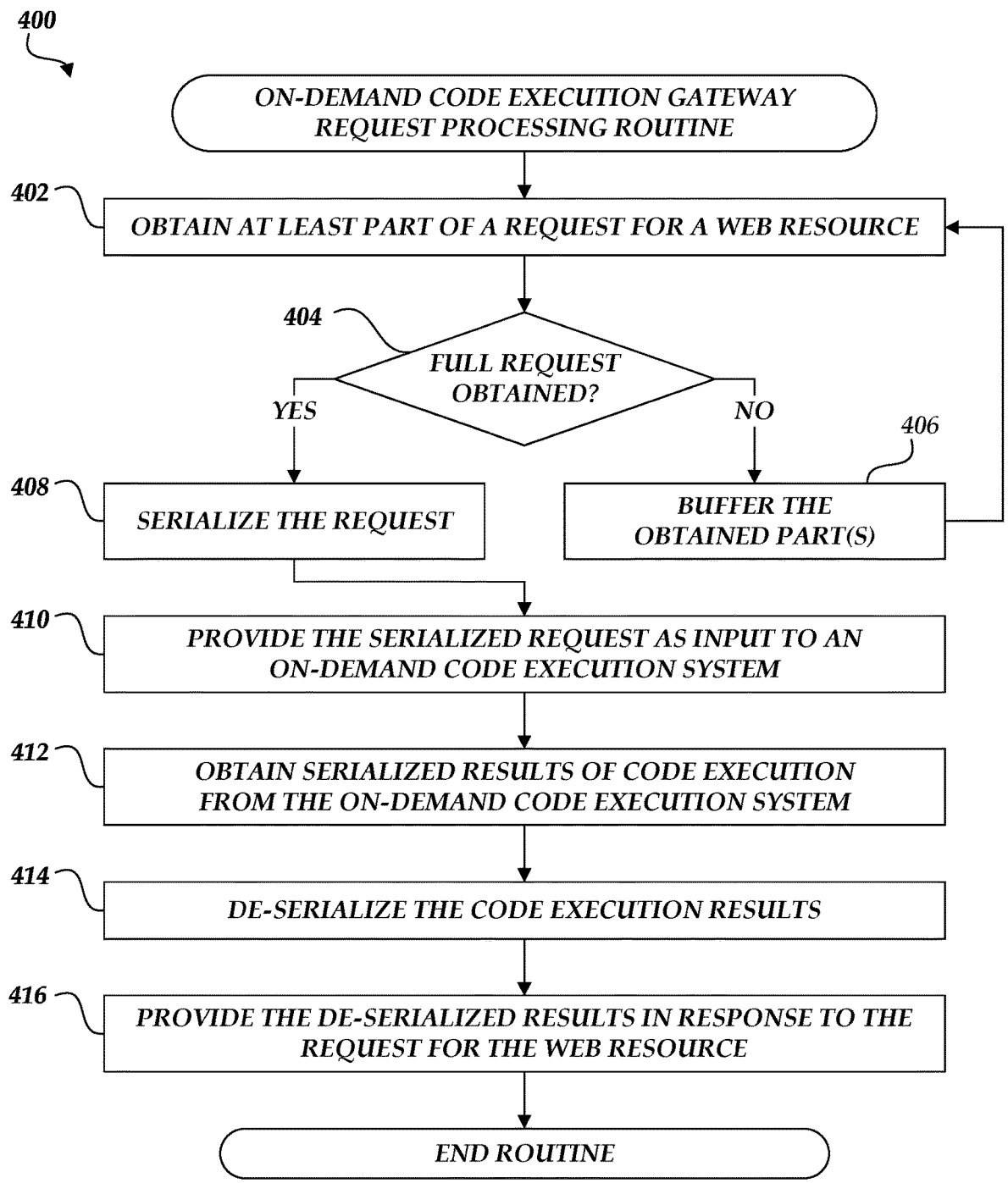
FIG. 4 is a flow chart depicting an illustrative routine for facilitating interactions between an on-demand code execution system and a client computing device that is not configured to access the on-demand code execution system, in accordance with aspects of the present disclosure.

FIG. 4 is a flow diagram of an illustrative routine 400 for processing requests for computing resources by using an on-demand code execution gateway. The routine 400 may be carried out, for example, by the on-demand code execution gateway 170 depicted in FIG. 1 or various components thereof. At block 402, at least part of a request for a network resource may be obtained. Illustratively, the request may be to access web content, interact with an application, read or write to a storage volume, or access other resources. In various embodiments, as described above, the request may be received in its entirety or received in stages or portions.

At decision block 404, a determination may be made as to whether a complete request has been obtained. If not, then the routine 400 branches to block 406, where the portions of the request that have been obtained thus far are stored in a memory buffer until the rest of the request is received. The routine 400 then returns to block 402 and awaits further portions of the request. In some embodiments, the routine 400 may process multiple requests in parallel, and may determine which request is associated with the portion received at block 402 and whether the portion completes that request. Additionally, in some embodiments, the size of a complete request may exceed the size of the memory buffer for storing requests. If so, then in various embodiments the routine 400 may reject the request, truncate the request, assign the request to a web server (e.g., the web server(s) 180 as depicted in FIG. 1), stream all or part of the request to an on-demand code execution system, divide the request into smaller requests, or otherwise process the request.

If the determination at decision block 404 is that a complete request has been obtained, then the routine 400 branches to block 408, where the complete request may be serialized. As described above, all or part of the request may be serialized by converting or encoding the request into a format accepted by the on-demand code execution system. The request may, for example, be converted into a JSON object or objects, an HTTP method, an API call, or otherwise encoded into another format or notation.

At block 410, the serialized request may be provided as encoded input to an on-demand code execution system, and at block 412 the resulting encoded output may be obtained in a serialized format. Illustratively, as described above, the routine 400 may include authentication information as part of the request, or in some embodiments may authenticate separately from submitting a request to execute the task. For example, the routine 400 may provide credentials that confirm the user who submitted the code has authorized access via an on-demand code execution gateway. In other embodiments, the routine 400 may authenticate the request itself by signing the request or including a hash key as part of the request.

At block 414, the output from executing the task may be de-serialized and converted into a format understood by the requesting computing device. For example, the output may be converted from a JSON object or objects into an HTTP response, or all or part of the output may be converted from base64 notation into a binary notation. In some embodiments, the output may be made similar or identical to output that a server would provide if executing the task or an analogous task. In other embodiments, information indicating that the request was fulfilled by an on-demand code execution may be included in the output. At block 416, the de-serialized output may be provided in response to the original request.

Figure 5:
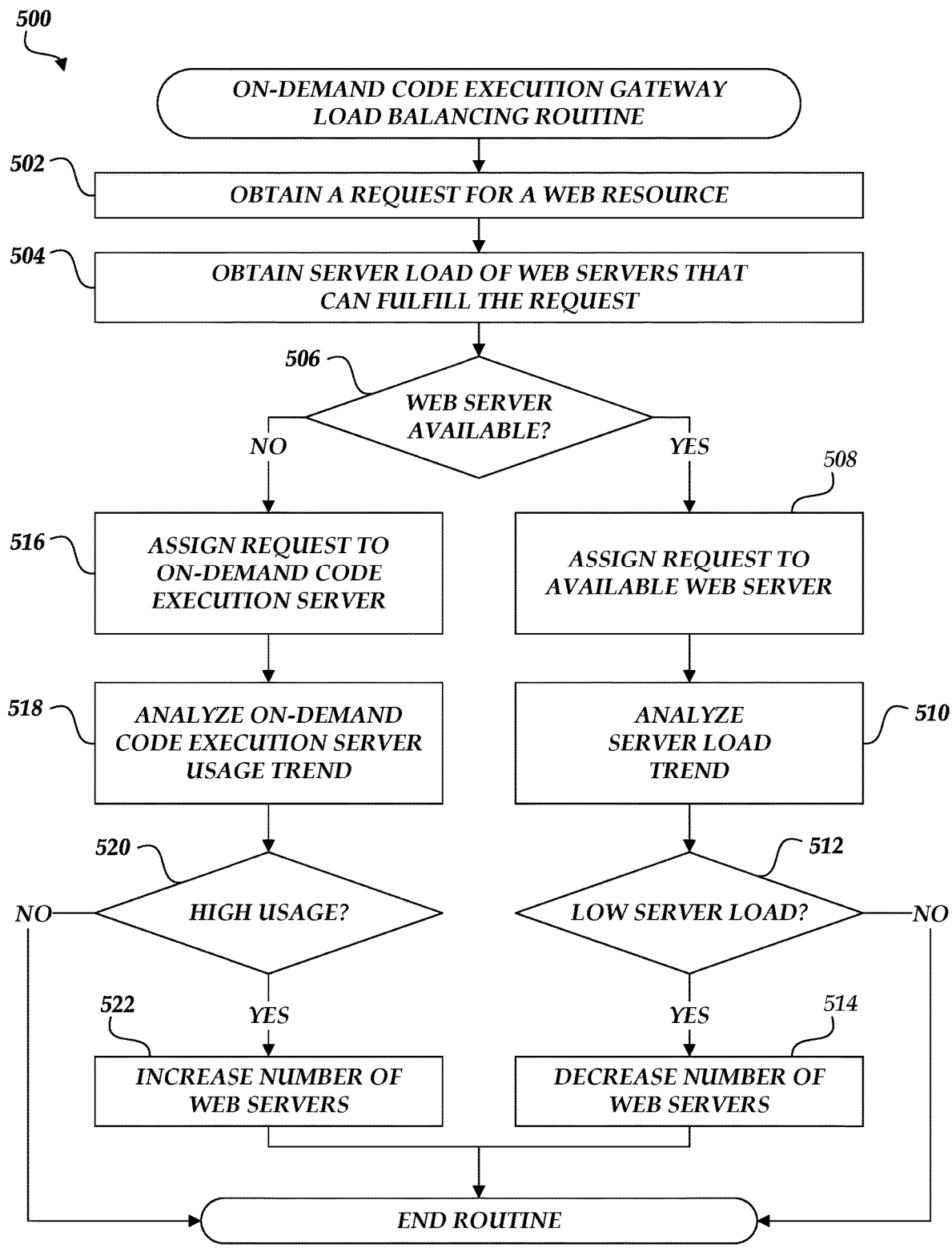
FIG. 5 is a flow chart depicting an illustrative routine for using an on-demand code execution gateway to manage server resources in a hosted computing environment that includes an on-demand code execution system.

FIG. 5 if a flow diagram of an illustrative routine 500 for utilizing an on-demand code execution system to provide load balancing. Offloading requests to an on-demand code execution system may allow more efficient management of computing resources. For example, on-demand code execution may be utilized to address portions of a workload that exceed the capacity of a pool of servers, but that are not sufficient to justify increasing the size of the pool. As further examples, on-demand code execution may be utilized to allow underused servers to be removed from the pool, or to handle a sudden increase in requests when servers cannot be added to the pool quickly enough.

At block 502, a request for a computing resource may be obtained as described above. At block 504, information regarding the current load of servers that can fulfill the request may be obtained. In some embodiments, as described above, server load information may be obtained from the servers themselves as metrics representing resource utilization or consumption. In other embodiments, server load may be determined or estimated based on the number and rate at which previous iterations of the routine 500 have assigned requests to the servers.

At decision block 506, a determination may be made as to whether a server is available to fulfill the request. In some embodiments, the incremental workload that the request represent may be determined, and the determination may be as to whether a server can accept the incremental workload and still meet performance targets (e.g., response times or resource utilization targets). In other embodiments, the capacity of each server may be determined or predetermined as a number of requests that can be processed in parallel, and this threshold may be compared to the number of requests that a server is currently processing. If the determination is that a server is available, then at block 508 the request is assigned to the server. At block 510, server load information may be compared to historical server load information, and an assessment may be made as to whether the servers are underutilized or whether it would be more efficient to fulfill more requests using on-demand code execution.

At decision block 512, a determination may be made as to whether server workloads and utilization of on-demand code execution are such that the number of servers should be reduced. If so, then at block 514 one or more servers may be released. Illustratively, a server may be released by deactivating a virtual machine instance, de-allocating physical hardware that has been allocated to a resource pool, or otherwise removing computing resources from the server pool. If the determination is that the number of servers should not be reduced, then the routine 500 ends without taking further action. In some embodiments, the routine 500 is executed continuously and instead branches to block 502 to await further requests for resources.

If the determination at decision block 506 is that no web server has sufficient available capacity to fulfill the request, then the routine 500 branches to block 516. In some embodiments, the determination at decision block 506 may be based on criteria other than the available capacity of the servers. For example, a determination may be made that on-demand code execution is likely to provide a faster response given the current server workloads, or that the characteristics of a particular request make on-demand code execution preferable. For example, on-demand code execution may be faster (or may provide acceptable performance) for certain types of requests, while other types of requests may require server resources. In further embodiments, the code that is executed by the on-demand code execution service may differ from the code executed by the servers, and may provide different results under certain conditions. The determination at decision block 506 may therefore be as to whether the conditions are met.

At block 516, the request may be assigned to an on-demand code execution server and fulfilled by executing user-submitted code, as described above. At block 518, usage of the on-demand code execution server may be analyzed relative to historical usage of on-demand code execution or usage of the servers. In some embodiments, the server load information obtained at block 504 may be analyzed.

At decision block 520, a determination may be made as to whether the usage of the on-demand code execution server is such that the size of the server pool should be increased. Illustratively, the determination may be that the usage exceeds a threshold for a specified time interval, or that the usage trend is increasing at a threshold rate. If the determination is that adding a server or server(s) to the pool is justified, then at block 522 one or more servers are added. If not, then the routine 500 ends (or in some embodiments returns to block 502 and awaits further input).

The blocks of the routines described above may vary in embodiments of the present disclosure. For example, in some embodiments of the routine 400, block 414 may be omitted and the output of the on-demand code execution may be provided in a serialized format. As a further example, blocks 510-514 and 516-522 of the routine 500 may be carried out independently of obtaining a request for a computing resource. For example, these blocks may be carried out periodically or in response to detecting that server loads are above or below a threshold. The routines may further include additional blocks, or the blocks of the routines may be rearranged or combined, according to various embodiments. In further embodiments, all or part of the routines may be combined.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might," or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. A computer-implemented method comprising:
receiving a plurality of requests for a first network resource corresponding to a first uniform resource locator ("URL");
distributing individual requests of the plurality of requests to individual servers of a plurality of servers that are configured to fulfill requests for the first network resource, wherein the individual requests are distributed to balance a workload of the plurality of servers;
receiving, from a computing device, an additional request for the first network resource;
determining whether to distribute the additional request to an individual server of the plurality of servers or alternatively to a serverless computing system based at least in part on a predicted time of the plurality of servers to fulfill the additional request for the first network resource and independent of a capacity of the serverless computing system;
identifying a first user-submitted task that, when executed in an execution environment managed by the serverless computing system, generates output corresponding to the first network resource;
in response to a determination to distribute the additional request to the serverless computing system to fulfill the additional request, causing the serverless computing system to execute the first user-submitted task in the execution environment to generate the output corresponding to the first network resource;
determining that a number of requests fulfilled by the serverless computing system within a specified time interval exceeds a threshold;
causing an additional server to be configured to fulfill requests for the network resource and added to the plurality of servers; and
transmitting, to the computing device, a response that fulfills the additional request based at least in part on the output generated by execution of the first user-submitted task in the execution environment managed by the serverless computing system.

2. The computer-implemented method of claim 1, wherein causing the serverless computing system to execute the first user-submitted task in the execution environment to generate the output corresponding to the first network resource comprises:
generating encoded input based at least in part on the additional request for the first network resource; and
transmitting the encoded input to the serverless computing system.

3. The computer-implemented method of claim 2, wherein the encoded input includes information identifying the first user-submitted task.

4. The computer-implemented method of claim 1 further comprising:
determining, based at least in part on the additional request, to increase the number of servers in the plurality of servers; and
causing at least one additional server to be added to the plurality of servers.

5. The computer-implemented method of claim 4, wherein determining to increase the number of servers in the plurality of servers is based at least in part on a plurality of previous requests for the first network resource that were fulfilled by the serverless computing system.

6. The method of claim 1, wherein determining whether to distribute the additional request to an individual server of the plurality of servers or alternatively to a serverless computing system is further based on a projected utilization percentage of the individual server with respect to the additional request.

7. The method of claim 1, wherein determining whether to distribute the additional request to an individual server of the plurality of servers or alternatively to a serverless computing system is based at least in part on the response time and current capacities of individual servers of the plurality of servers to fulfill the additional request for the first network resource and independent of a capacity of the serverless computing system.

8. A system comprising:
a non-transitory data store storing information regarding tasks that are executable on a serverless computing system; and
a first computing device configured with executable instructions to:
receive, from a second computing device, a request for a network resource;
identify a set of servers configured to fulfill requests for the network resource;
obtain capacity information regarding current capacities of individual servers of the set of servers to fulfill the requests for the network resource;
determine, based at least in part on a predicted time of set of servers and independent of a capacity of the serverless computing system, whether to fulfill the request by executing a task on the serverless computing system or by assigning the request to a server of the set of servers;
in response to determining to fulfill the request by executing the task on the serverless computing system, cause the serverless computing system to execute the task and generate output;
determine that a number of requests fulfilled by the serverless computing system within a specified time interval exceeds a threshold;
cause an additional server to be configured to fulfill requests for the network resource and added to the set of servers; and
transmit a version of the output to the second computing device, wherein the version of the output corresponds to and fulfills the request for the network resource.

9. The system of claim 8, wherein the first computing device is further configured to determine the capacity information.

10. The system of claim 9, wherein the capacity information is determined based at least in part on a plurality of previous requests for the network resource.

11. The system of claim 8, wherein the first computing device is further configured to generate a demand forecast for the network resource.

12. The system of claim 11, wherein the first computing device is further configured to determine, based at least in part on a length of time required to add a server to the set of servers, to fulfill at least a portion of the demand forecast by using the serverless computing system.

13. The system of claim 11, wherein the first computing device is further configured to determine, based at least in part on a cost-benefit analysis of adding a server to the set of servers, to fulfill at least a portion of the demand forecast by using the serverless computing system.

14. The system of claim 11, wherein the first computing device is further configured to determine, based at least in part on the demand forecast, to remove a server from the set of servers.

15. The system of claim 14, wherein a size of the set of servers is reduced to zero.

16. The system of claim 8, wherein the first computing device is further configured to identify the task based at least in part on the request.

17. A non-transitory computer-readable medium including computer-executable instructions that, when executed by a computing device, cause the computing device to:
  determine, based at least in part on a predicted time of a set of servers configured to fulfill requests for network resources and independent of a capacity of a serverless computing system, whether to fulfill a request for a network resource by executing a task on the serverless computing system or by assigning the request to a server of the set of servers;
  in response to determining to fulfill the request for the network resource by executing the task on the serverless computing system, cause the serverless computing system to execute the task and transmit a version of output generated by the serverless computing system executing the task, wherein the version of the output fulfills the request for the network resource,
  determine that a number of requests fulfilled by the serverless computing system within a specified time interval exceeds a threshold; and
  cause an additional server to be configured to fulfill requests for the network resource and added to the set of servers.

18. The non-transitory computer-readable medium of claim 17, wherein the version of the output comprises a de-serialized JavaScript Object Notation ("JSON") object.

19. The non-transitory computer-readable medium of claim 17 including further computer-executable instructions that cause the computing device to generate a serialized JSON object corresponding to the request for the network resource.

20. The non-transitory computer-readable medium of claim 19 including further computer-executable instructions that cause the computing device to transmit the serialized JSON object to the serverless computing system.

21. The non-transitory computer-readable medium of claim 17 including further computer-executable instructions that cause the computing device to adjust a size of the set of servers based at least in part on a capacity information and information regarding previous requests fulfilled by the serverless computing system.

* * * * *

UNITED STATES PATENT AND TRADEMARK OFFICE
CERTIFICATE OF CORRECTION

Page 1 of 1

PATENT NO. : 12,327,133 B1
APPLICATION NO. : 16/362515
DATED : June 10, 2025
INVENTOR(S) : Lodaya Varun Mukesh et al.

It is certified that error appears in the above-identified patent and that said Letters Patent is hereby corrected as shown below:

On the Title Page

Page 10, Column 1, Line 53 (item (56) Other Publications), delete "in PCT/US2015/064071dated Mar." and insert -- in PCT/US2015/064071 dated Mar. --.

In the Claims

Column 22, Claim 17, Line 7, delete "network resource, determine" and insert -- network resource; determine --.

Signed and Sealed this
Sixteenth Day of September, 2025

Coke Morgan Stewart
*Acting Director of the United States Patent and Trademark Office*